United States Patent
Ikeda et al.

(10) Patent No.: US 11,301,978 B2
(45) Date of Patent: Apr. 12, 2022

(54) DEFECT INSPECTION DEVICE, DEFECT INSPECTION METHOD, AND COMPUTER READABLE RECORDING MEDIUM

(71) Applicant: OMRON Corporation, Kyoto (JP)

(72) Inventors: Yasuyuki Ikeda, Kyoto (JP); Masashi Kurita, Kyoto (JP)

(73) Assignee: OMRON Corporation, Kyoto (JP)

( * ) Notice: Subject to any disclaimer, the term of this patent is extended or adjusted under 35 U.S.C. 154(b) by 129 days.

(21) Appl. No.: 16/249,917

(22) Filed: Jan. 17, 2019

(65) Prior Publication Data

US 2019/0287235 A1 Sep. 19, 2019

(30) Foreign Application Priority Data

Mar. 14, 2018 (JP) .............................. JP2018-046534

(51) Int. Cl.
*G06T 7/00* (2017.01)
*G06T 7/62* (2017.01)
(Continued)

(52) U.S. Cl.
CPC .......... *G06T 7/0004* (2013.01); *G06T 7/0008* (2013.01); *G06T 7/136* (2017.01);
(Continued)

(58) Field of Classification Search
CPC ......... G06T 7/0004; G06T 7/136; G06T 7/62; G06T 7/90; G06T 7/0008;
(Continued)

(56) References Cited

U.S. PATENT DOCUMENTS

2004/0228515 A1* 11/2004 Okabe .................. G06T 7/0004
382/145
2013/0077850 A1* 3/2013 Hirai ..................... G06T 7/0004
382/149
2013/0294680 A1 11/2013 Harada et al.

FOREIGN PATENT DOCUMENTS

CN 102803940 11/2012
CN 102803940 12/2014
(Continued)

OTHER PUBLICATIONS

Ruoxu Ren et al: "A Generic Deep-Learning-Based Approach for Automated Surface Inspection", IEEE Transactions On Cybernetics, vol. 48, No. 3, Feb. 24, 2017 (Feb. 24, 2017), pp. 929-940, XP055492817, Piscataway, NJ, USA ISSN: 2168-2267, (Year: 2017).*

(Continued)

*Primary Examiner* — Srilakshmi K Kumar
*Assistant Examiner* — Umair Ahsan
(74) *Attorney, Agent, or Firm* — JCIPRNET

(57) ABSTRACT

An image generating part generating feature extraction images by applying an identification part, which has completed learning, that has executed learning in advance to extract features using learning image data to an inspection image, an inspection part specifying an area corresponding to a defect on the basis of judgment parameters for judging presence/absence of a defect in the inspection target object and a binary image generated on the basis of the feature extraction images, and a setting part calculating an image score based on a density of a color of pixels of a setting image using the setting image that is the binary image in which an area corresponding to the defect is specified and updating the judgment parameters such that a difference between an image score of the inside of the area and an (Continued)

image score of the outside of the area becomes relatively large are included.

14 Claims, 16 Drawing Sheets

(51) Int. Cl.
*G06T 7/90* (2017.01)
*G06T 7/136* (2017.01)

(52) U.S. Cl.
CPC .............. *G06T 7/62* (2017.01); *G06T 7/90* (2017.01); *G06T 2207/20081* (2013.01); *G06T 2207/20084* (2013.01); *G06T 2207/20092* (2013.01); *G06T 2207/20104* (2013.01); *G06T 2207/30164* (2013.01); *G06T 2207/30168* (2013.01)

(58) Field of Classification Search
CPC . G06T 2207/20081; G06T 2207/20084; G06T 2207/20092; G06T 2207/20104; G06T 2207/30164; G06T 2207/30168
See application file for complete search history.

(56) References Cited

FOREIGN PATENT DOCUMENTS

| CN | 109117842 | 1/2019 |
|----|-----------|--------|
| JP | H09179985 | 7/1997 |
| JP | 2006090921 | 4/2006 |
| JP | 2006293528 | 10/2006 |
| JP | 2008175588 | 7/2008 |
| JP | 2017-49974 | 3/2017 |
| JP | 2018005639 | 1/2018 |

OTHER PUBLICATIONS

Ruoxu Ren et al, "A Generic Deep-Learning-Based Approach for Automated Surface Inspection", IEEE Transactions On Cybernetics, vol. 48, No. 3, Mar. 2018, pp. 929-940.
"Search Report of Europe Counterpart Application", dated Jul. 30, 2019, pp. 1-11.
Amar R. Marathe, et al., "Confidence Metrics Improve Human-Autonomy Integration." 2014 9th ACM/IEEE International Conference on Human-Robot Interaction (HRI), Mar. 3-6, 2014, pp. 240-241.
"Office Action of Europe Counterpart Application", dated Feb. 11, 2021, p. 1-p. 8.
"Office Action of Japan Counterpart Application", dated May 24, 2021, with English translation thereof, pp. 1-6.
"Office Action of China Counterpart Application", dated May 21, 2021, with English translation thereof, p. 1-p. 18.

\* cited by examiner

| Classification | Learning image | | | Teacher data (label) |
|---|---|---|---|---|
| Background |  | | ⁕⁕⁕⁕⁕ | 0 |
| Black point |  | | ⁕⁕⁕⁕⁕ | 1 |
| White point |  | | ⁕⁕⁕⁕⁕ | 2 |
| Black line |  | | ⁕⁕⁕⁕⁕ | 3 |
| White line |  | | ⁕⁕⁕⁕⁕ | 4 |

GT

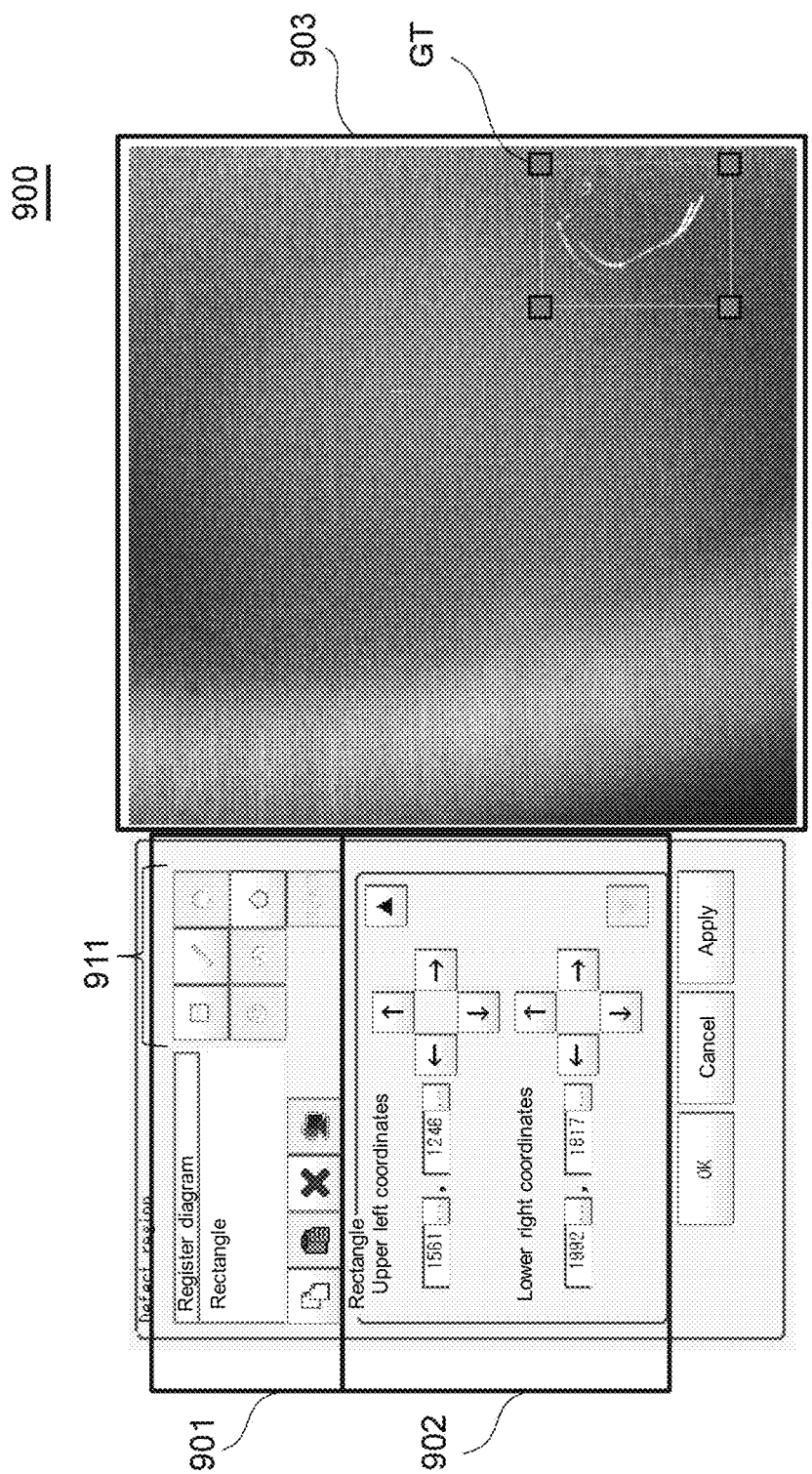

DEFECT INSPECTION DEVICE, DEFECT INSPECTION METHOD, AND COMPUTER READABLE RECORDING MEDIUM

CROSS-REFERENCE TO RELATED APPLICATION

This application claims the priority of Japan patent application serial no. 2018-046534, filed on Mar. 14, 2018. The entirety of the above-mentioned patent application is hereby incorporated by reference herein and made a part of this specification.

BACKGROUND

Technical Field

The disclosure relates to a defect inspection device, a defect inspection method, and a computer readable recording medium including a program capable of executing a defect detecting process using an identification part generated through machine learning.

Description of Related Art

In the field of factory automation (FA), automatic control using an image measuring process is widely applied. For example, a process in which an inspection target such as a work piece is imaged, and the quality of the work piece is inspected on the basis of a feature quantity extracted from the captured image is realized.

For example, Patent Document 1 discloses a device that judges presence/absence of defects of an inspection target on the basis of results of output of an identification part that has executed learning using images of an inspection target imaged with a plurality of imaging conditions as learning data. More specifically, the device disclosed in Patent Document 1 includes a learning extraction part that extracts feature quantities of an image from each of at least two images based on images acquired by imaging a target object, of which the quality of an external appearance is known, with at least two different imaging conditions, a selection part that selects a feature quantity used for judging the quality of the target object from feature quantities ranging over the feature quantities extracted from the at least two images by the learning extraction part, and a generation part that generates an identification part used for judging the quality of the target object on the basis of the feature quantity selected by the selection part.

PATENT DOCUMENTS

[Patent Document 1] Japanese Laid-Open No. 2017-49974

A conventional identification part as disclosed in Patent Document 1 learns to detect presence/absence of a defect on the basis of feature quantities of images. However, there are various inspection conditions such as types of work pieces flowing on a production line and imaging conditions according to the production line, and the inspection conditions cannot be determined to necessarily coincide with conditions at the time of learning. Accordingly, in a case in which an identification part that has executed learning in advance is actually used for a production line, there are cases in which an output result of the identification part is influenced by noise or the like. Here, noise is an unnecessary feature quantity mixed in an image, for example, due to reflection of light, shade, and the like. Accordingly, in order to judge presence/absence of a defect on the basis of an output result of the identification part, it is preferable to adjust judgment parameters for separating noise and a defect from each other. Meanwhile, the adjustment takes time, and there are cases in which the productivity decreases.

SUMMARY

The disclosure employs the following configurations. According to one aspect of the disclosure, there is provided a defect inspection device including: an acquisition part that acquires an inspection image of an inspection target object; an image generating part that generates one or more feature extraction images by applying an identification part, which has completed learning, that has executed learning in advance to extract one or more features using learning image data to the inspection image; an inspection part that specifies an area corresponding to a defect on the basis of one or more judgment parameters for judging presence/absence of a detection target portion in the inspection target object and a binary image generated on the basis of the feature extraction images; and a setting part that calculates an image score based on a density of a color of pixels of a setting image using the setting image that is the binary image in which an area corresponding to the defect is specified and updates the judgment parameters such that a difference between an image score of the inside of the area and an image score of the outside of the area becomes relatively large. A feature extraction image represents an image acquired by extracting predetermined features from an image input to the defect inspection device. A binary image represents an image which is generated on the basis of the feature extraction image, and in which presence/absence of a defect is determined by the inspection part.

In addition, according to one aspect of the disclosure, there is provided a defect inspection method using a computer. The defect inspection method includes: a step of acquiring an inspection image of an inspection target object; a step of generating one or more feature extraction images by applying an identification part, which has completed learning, that has executed learning in advance to extract one or more features using learning image data to the inspection image; a step of specifying an area corresponding to a defect on the basis of one or more judgment parameters for judging presence/absence of a detection target portion in the inspection target object and a binary image generated on the basis of the feature extraction images; and a step of calculating an image score based on a density of a color of pixels of a setting image using the setting image that is the binary image in which an area corresponding to the defect is specified and updating the judgment parameters such that a difference between an image score of the inside of the area and an image score of the outside of the area becomes relatively large.

In addition, according to one aspect of the disclosure, there is provided a program causing a computer to function as: a part that acquires an inspection image of an inspection target object; a part that generates one or more feature extraction images by applying an identification part, which has completed learning, that has executed learning in advance to extract one or more features using learning image data to the inspection image; a part that specifies an area corresponding to a defect on the basis of one or more judgment parameters for judging presence/absence of a detection target portion in the inspection target object and a binary image generated on the basis of the feature extraction images; and a part that calculates an image score based on a density of a color of pixels of a setting image using the setting image that is the binary image in which an area corresponding to the defect is specified and updates the judgment parameters such that a difference between an image score of the inside of the area and an image score of the outside of the area becomes relatively large.

BRIEF DESCRIPTION OF THE DRAWINGS

FIG. 10D is a schematic diagram illustrating one example of a user interface screen 200 provided by a defect inspection device according to this embodiment;

DESCRIPTION OF THE EMBODIMENTS

Figure 1:
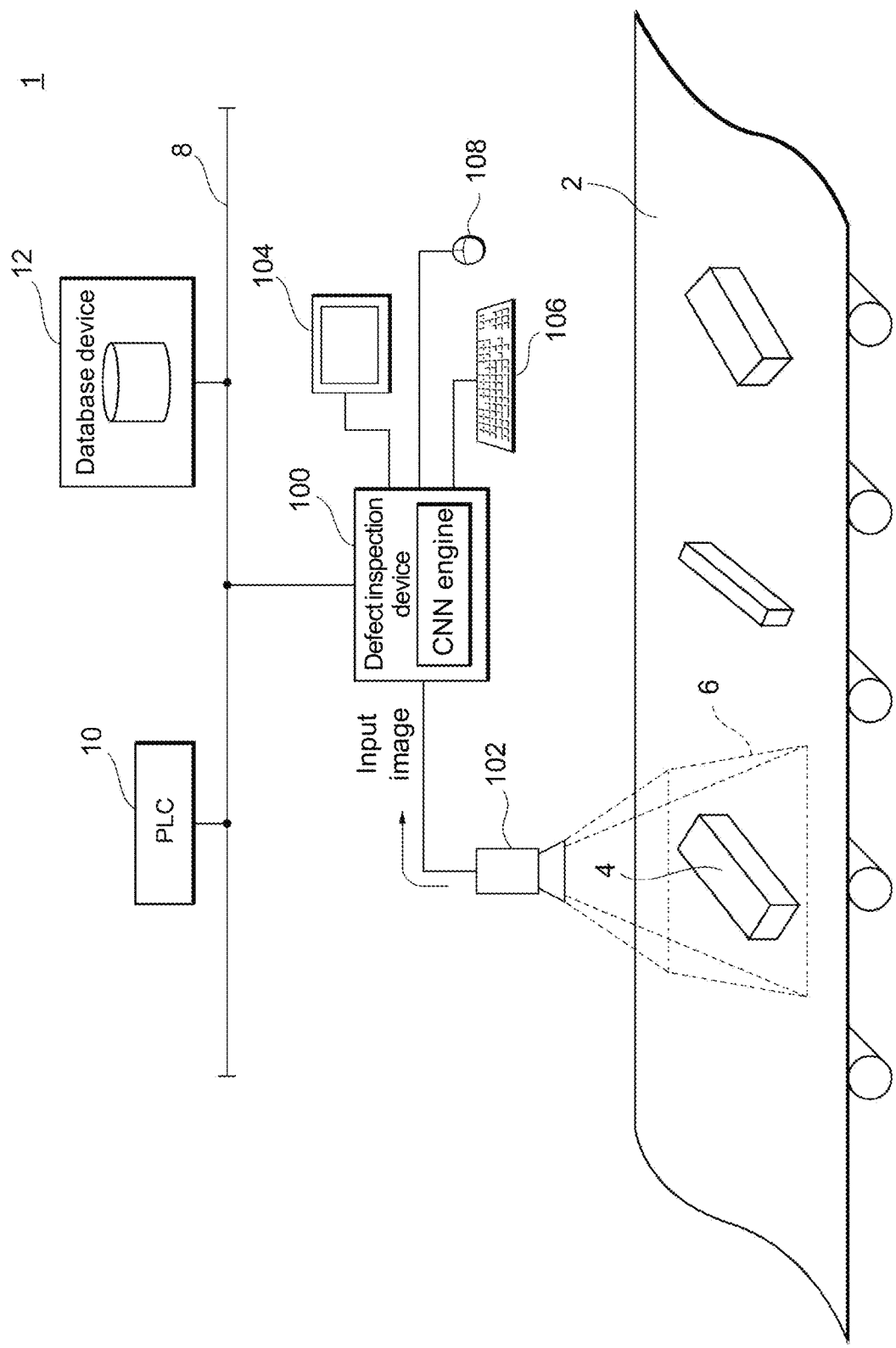
FIG. 1 is a schematic diagram illustrating a system configuration example of a defect inspection system according to this embodiment.

The disclosure provides a technology for appropriately setting judgment parameters used for determining presence/absence of a defect in a simplified manner in an inspection device that inspects presence/absence of a defect using a result output by an identification part that has executed learning in advance.

According to the configuration described above, in the defect inspection device inspecting presence/absence of a defect using a result output by the identification part that has executed learning in advance, the judgment parameters used for judging the presence/absence of a defect can be appropriately set in a simplified manner. The judgment parameters can be appropriately set, and accordingly, erroneous judgment decreases. Particularly, since noise can be decreased, erroneous detection of recognizing a defect that is not a real defect decreases. In addition, since the judgment parameters can be set in a simplified manner, the number of setting processes and the number of establishment processes of the defect inspection device can be decreased.

In the defect inspection device according to the one aspect described above, the binary image is composed of white pixels and black pixels, a density value is associated with each of the white pixels and the black pixels, and the setting part may be configured to calculate a sum value of density values of a plurality of pixels included inside the area as a first image score, calculate a sum value of density values of a plurality of pixels included outside the area as a second image score, and update the judgment parameters such that a difference between the first image score and the second image score becomes a maximum. According to this aspect, by calculating image scores and comparing the image scores with each other, the defect inspection device can search for appropriate judgment parameters.

In addition, the judgment parameters may be configured to include a binarization level used for generating the binary image. Furthermore, the judgment parameters may be configured to include one or more judgment items used for determining the binary image and a judgment threshold set for each of the judgment items. According to this aspect, the threshold used for generating a binary image that is a target for determining presence/absence of a defect using the inspection part can be appropriately set in a simplified manner. In this way, erroneous judgment can be further decreased.

In addition, in the defect inspection device according to the one aspect described above, the one or more judgment items used for judging the defect may be configured to include at least one of an area, a width and/or a height of a bounding rectangle, a circumference, an aspect ratio, and circularity of a predetermined area represented as a group of pixels having the same color in the binary image, and the judgment threshold may be configured to include an upper limit value and/or a lower limit value set for each of the judgment items. According to this aspect, the defect inspection device can set the judgment threshold for each judgment item. In this way, more appropriate judgment parameters can be set.

In addition, the judgment items and the judgment threshold may be determined on the basis of a feature quantity of a defect included in learning image data used when the image generating part or the inspection part executes learning. According to this aspect, the defect inspection device can set a judgment condition corresponding to a distribution of forms of defects included in learning images included in the learning data set, and a defect having a form that is equivalent to the defect included in the learning data set can be extracted.

In addition, the defect inspection device according to the one aspect described above may further include a display part that accepts designation of the area, and the inspection part may be configured to specify an area judged as a defect on the basis of the judgment parameters set in advance and output the specified area to the display part together with the inspection image, and the setting part may be configured to generate the setting image on the basis of designation of the area accepted through the display part. According to this aspect, a user can adjust the judgment parameters set in advance ex post facto, and the system of defect inspection using the inspection part can be appropriately and easily adjusted. As a result, the load of the user relating to the adjustment of accuracy of defect detection of the inspection part can be further decreased.

In addition, in the defect inspection device according to the one aspect described above, the inspection part may be configured to specify an area judged as a defect in the binary image on the basis of a judgment threshold set for each of one or more feature quantities used for judging a defect in the binary image and present the specified area to a user, and the setting part may be configured to accept designation of an area that is judged as a defect by the inspection part but should not have been judged as a defect and/or an area that is not judged as a defect by the inspection part but should have been judged as a defect from the user and update the judgment threshold on the basis of the designation. In addition, the one or more judgment items used for judging the defect and the judgment threshold may be determined on the basis of designation from the user. According to this aspect, a user can adjust the judgment parameters set in advance ex post facto, and the system of defect inspection using the inspection part can be appropriately and easily adjusted.

According to the configuration described above, in the defect inspection method for inspecting presence/absence of a defect using a result output by the identification part that has executed learning in advance, the judgment parameters used for judging the presence/absence of a defect can be appropriately set in a simplified manner. The judgment parameters can be appropriately set, and accordingly, erroneous judgment decreases. Particularly, since noise can be decreased, erroneous detection of recognizing a defect that is not a real defect decreases. In addition, since the judgment parameters can be set in a simplified manner, the number of setting processes and the number of establishment processes of the defect inspection device can be decreased.

According to the configuration described above, in the program inspecting presence/absence of a defect using a result output by the identification part that has executed learning in advance, the judgment parameters used for judging the presence/absence of a defect can be appropriately set in a simplified manner. The judgment parameters can be appropriately set, and accordingly, erroneous judgment decreases. Particularly, since noise can be decreased, erroneous detection of recognizing a defect that is not a real defect decreases. In addition, since the judgment parameters can be set in a simplified manner, the number of setting processes and the number of establishment processes of the defect inspection device can be decreased.

According to the disclosure, a technology for appropriately setting judgment parameters used for determining presence/absence of a defect in a simplified manner in a defect inspection device that inspects presence/absence of a defect using a result output by an identification part that has executed learning in advance is provided.

Hereinafter, an embodiment according to one aspect of the disclosure (hereinafter, also referred to as "this embodiment") will be described with reference to the drawings. The embodiment described below is merely an example of the disclosure in every aspect. It is apparent that various modifications and changes can be made without departing from the scope of the disclosure. In other words, a specific configuration according to an embodiment may be appropriately employed in execution of the disclosure. In addition, while data appearing in this embodiment will be described using natural language, more specifically, pseudo language, a command, a parameter, machine language, or the like that can be recognized by a computer is designated.

§ 1 Application Example

First, one example of a situation in which the disclosure is applied will be described with reference to FIG. 1. FIG. 1 is a schematic diagram illustrating one example of a situation in which a defect inspection system 1 according to this embodiment is applied. The defect inspection system 1 according to this embodiment can assist an operator (hereinafter, also referred to as a "user") such that appropriate judgment parameters are set in accordance with features extracted as defects when a defect inspection is executed for an input image generated by imaging an inspection target. In addition, the inspection target, for example, includes work pieces such as parts and products that are in a manufacturing process.

As illustrated in FIG. 1, the defect inspection system 1, for example, realizes an appearance inspection or appearance measurement of a work piece 4, which is an inspection target conveyed on a belt conveyer 2, by executing an image measuring process for an input image acquired by imaging the work piece 4. In the following description, while an example in which it is applied to an inspection of presence/absence of a defect on the surface of the work piece 4 or the like will be described as a typical example of the image measuring process, the application is not limited thereto. Thus, the image measuring process can be applied also to specifying of a type of defect, measurement of the size of an appearance shape of a defect, and the like.

A camera 102 that is an imaging part is disposed above the belt conveyer 2, and the camera 102 is configured such that an imaging visual field 6 thereof includes a predetermined area of the belt conveyer 2. Image data generated by imaging executed by the camera 102 (hereinafter, also referred to as an "input image") is transmitted to a defect inspection device 100. The imaging executed by the camera 102 is executed periodically or irregularly.

The defect inspection device 100 is connected to a programmable controller (PLC) 10, a database device 12, and the like through a higher-rank network 8. A result of measurement acquired by the defect inspection device 100 may be transmitted to the PLC 10 and/or the database device 12. An arbitrary device may be connected to the higher-rank network 8 in addition to the PLC 10 and the database device 12.

A display 104 used for displaying an in-process state, a measurement result, and the like and a keyboard 106 and a mouse 108 serving as input parts receiving user operations may be connected to the defect inspection device 100.

The defect inspection device 100 includes an identification part generated through machine learning. As one example, the defect inspection device 100 includes a convolutional neural network (CNN) engine. The CNN engine configures an identification part using a CNN and is configured to generate a probability of an input image belonging to each one of a plurality of classes (classifications) corresponding to a predetermined feature designated in advance and a feature extraction image corresponding to each class.

Here, the feature extraction image represents an image acquired by extracting predetermined features from an input image. In this embodiment, there are five predetermined features (classes) including a background, a black point, a white point, a black line, and a white line. The CNN engine executes advance learning on the basis of a learning data set including a learning image and teacher data (label) prepared for each one of the plurality of classes described above, thereby generating a feature extraction image in which the predetermined features are extracted from the input image. The CNN engine acquires internal parameters, which are adjusted such that a probability of belonging to a predetermined class and a feature extraction image are generated through advance learning using a learning data set, in advance. Here, the internal parameters include a configuration of a neural network (for example, the number of layers of the neural network, the number of neurons in each layer, a connection relation between neurons, and an active function of each neuron) and a hyper parameter (information representing a weighting factor of a connection between neurons and a threshold of each neuron). In this embodiment, the predetermined features include a feature relating to the form of a defect and a feature relating to a density of the color of the defect. More specifically, a point defect and a line defect are included as features relating to the form of a defect, and a white defect and a black defect are included as features relating to the density of a color of the defect. In accordance with such a combination, the CNN engine according to this embodiment includes a "white point," a "white line," a "black point," and a "black line" as the predetermined classes and generates one or more feature extraction images corresponding to each class. These feature extraction images are represented in gray scale. The configuration of the CNN engine and a learning process of the CNN engine will be described later.

In addition, the defect inspection device 100 includes a detection part (hereinafter, referred to also as a "post processing part") that generates a binary image in which a feature corresponding to each class is represented as a white pixel or a black pixel on the basis of one or a plurality of feature extraction images output by the CNN engine and determines presence/absence of a defect in a target work piece using this binary image and parameters for judgment (hereinafter, also referred to as "judgment parameters"). In addition, the post processing part can detect a size, a position, a type, and the like of a defect in addition to the presence/absence of the defect. Here, the judgment parameters are parameters including a binarization level used for generating a binary image, a judgment item used for judging whether or not a feature included in the binary image is to be judged as a defect, and a judgment threshold set in correspondence with each judgment item. As judgment items, there are an area of pixels representing a feature, a width and a height of a bounding rectangle, a circumference, a circularity, and the like. Here, the circularity is a numerical value used for representing a degree of complexity of a diagram. As a value of the circularity becomes large, it represents that something is close to a circle and represents not a defect but a certain pattern. The judgment threshold includes a lower limit value and an upper limit value and is a threshold used for judging a feature having a feature quantity included between the lower limit value and the upper limit value as a defect.

There are various inspection conditions such as types of work pieces flowing on a production line and imaging conditions according to the production line, and the inspection conditions cannot be determined to necessarily coincide with conditions at the time of learning. For this reason, when the CNN that has completed learning is used for a production line, depending on an internal parameter, there are cases in which noise is included in a feature extraction image. Here, noise is an unnecessary feature quantity mixed in an image, for example, due to reflection of light, shades, and the like. Such noise becomes a cause of erroneous judgment in which a defect is judged not to be a defect or erroneous judgment in which a non-defect is judged to be a defect. Accordingly, in a case in which noise is included in a feature extraction image by the post processing part, there are cases in which a process of separating noise and a defect from each other is necessary. Although the process of separating noise and a defect from each other is performed on the basis of judgment parameters, it takes time and effort to perform appropriate manual adjustment of the judgment parameters in accordance with a production line, and the manual adjustment decreases the productivity.

The defect inspection device 100 according to this embodiment was made in consideration of such situations and has a function of updating judgment parameters used for separating noise included in a feature extraction image output by the CNN engine and a defect from each other using the post processing part in accordance with an input image for which a defect judgment is actually executed. More specifically, the defect inspection device 100 according to this embodiment first generates one or more feature extraction images by applying a learning machine (CNN) to an input image (inspection image). Then, for the one or more feature extraction images, an addition/subtraction process (may not be executed) and a binarization process based on an initial value of a binarization level set in advance are executed, whereby a binary image is generated. In addition, in the defect inspection device 100, a judgment process in which an inspection part specifies a defective part on the basis of initial values of judgment items set in advance and judgment thresholds is performed. At this time, the inspection part may display a result of the judgment process to a user (present an area judged as a defect together with an image) and accept feedback from the user. For example, in a case in which the inspection part is overlooks an area to be detected as a defect (defective area), the defect inspection device 100 may accept addition of a defective area from a user. In addition, in a case in which the inspection part erroneously judges noise as a defective area, the defect inspection device 100 may accept deletion of the defective area. When feedback is received from the user, the defect inspection device 100 adjusts judgment parameters (a binarization level, judgment items, and judgment thresholds) such that a difference between densities of the inside and the outside of the defective area becomes large using an image in which the defective area is designated (a setting image).

In addition, the process of "accepting designation of an area from a user through the display part" may not be executed. In such a case, an image in which a defective area is specified in advance may be acquired (as in S201 in a full-automatic mode illustrated in FIGS. 7 and 9, an image in which a defective area is specified in advance may be used).

In addition, the defect inspection device 100 according to this embodiment has a function (semi-automatic mode) through which a user can adjust at least preset judgment parameters as a mode for setting judgment parameters. Accordingly, the user may adjust judgment parameters in a case in which the preset judgment parameters are not appropriate, whereby the load of setting the judgment parameters can be decreased. In addition, the defect inspection device 10 according to this embodiment has a mode in which the judgment parameters are automatically set (full-automatic mode) and a function by which a user can manually set the judgment parameters (manual mode) in addition to the semi-automatic mode. Here, a first setting mode, a second setting mode, and a third setting mode respectively correspond to the semi-automatic mode, the manual mode, and the full-automatic mode.

§ 2 Configuration Example

<1. Hardware Configuration of Defect Inspection Device 100>

Next, the hardware configuration of the defect inspection device 100 included in the defect inspection system 1 according to this embodiment will be described.

Figure 2:
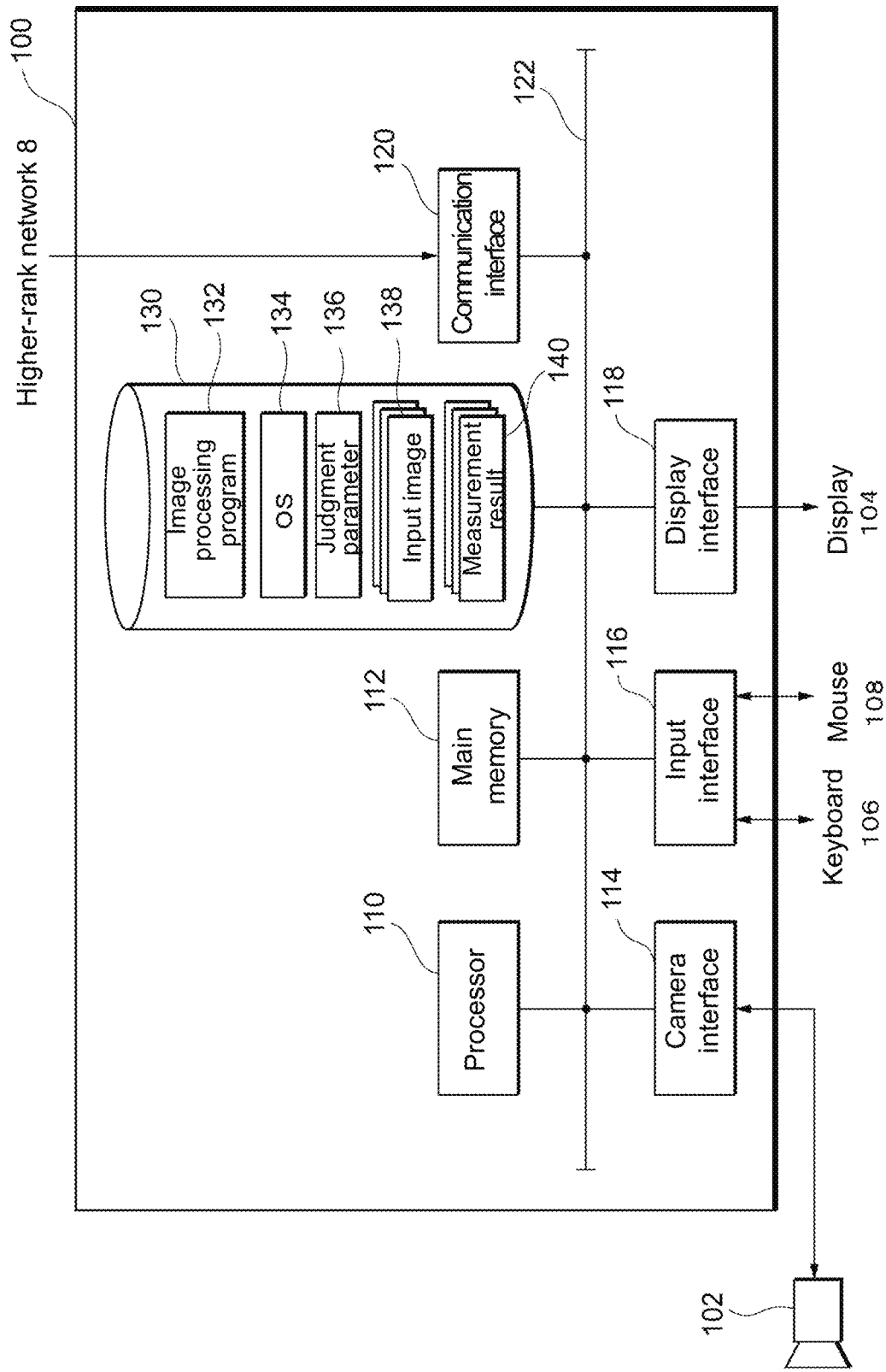
FIG. 2 is a schematic diagram illustrating the hardware configuration of a defect inspection device according to this embodiment.

FIG. 2 is a schematic diagram illustrating the hardware configuration of the defect inspection device 100 according to this embodiment. Referring to FIG. 2, the defect inspection device 100 may be realized using a general-purpose computer configured in accordance with a general computer architecture as one example. The defect inspection device 100 includes a processor 110, a main memory (main storage part) 112, a camera interface 114, an input interface 116, a display interface 118, a communication interface 120, and a storage (auxiliary storage part) 130. Such components are, typically, communicatively interconnected through an internal bus 122.

The processor 110 opens a program stored in the storage 130 in the main memory 112 and executes the program, thereby realizing functions and processes to be described later with reference to FIGS. 3 to 12. The main memory 112 is configured by a volatile memory and functions as a work memory that is necessary for execution of a program using the processor 110.

The camera interface is one example of an acquisition part. The camera interface 114 is connected to the camera 102 and acquires an input image captured by the camera 102. The camera interface 114 may instruct an imaging timing and the like to the camera 102.

The input interface 116 is connected to an input part such as the keyboard 106 and the mouse 108 operated by the user. The input interface 116 acquires a command representing an operation executed by the user for the input part or the like.

The display interface 118 is connected to the display 104 serving as a display part. The display interface 118 outputs various process results generated by the processor 110 executing a program to the display 104.

The communication interface 120 is responsible for a process used for communicating with the PLC 10, the database device 12, and the like through the higher-rank network 8.

The storage 130 stores programs used for causing a computer to function as the defect inspection device 100 such as an image processing program 132 used for realizing the CNN engine and an operating system (OS) 134. In addition, the storage 130 may store judgment parameters 136 used for realizing an image measuring process to be described later, an input image 138 acquired from the camera 102, and measurement results 140 acquired by the image measuring process.

The image processing program 132 stored in the storage 130 may be installed in the defect inspection device through an optical recording medium such as a digital versatile disc (DVD), a semiconductor recording medium such as a universal serial bus (USB) memory, or the like. Alternatively, the image processing program 132 may be downloaded from a server apparatus on a network or the like.

The image processing program 132 according to this embodiment may cooperate with the OS to provide necessary functions without including all the software modules used for realizing functions according to this embodiment.

The image processing program 132 according to this embodiment may be provided by being embedded in a part of another program. Also in such a case, the image processing program 132 does not include modules included in other programs that are combined as described above and executes a process in cooperation with the other programs. In this way, the image processing program 132 according to this embodiment may be in the form of being embedded in another program.

In FIG. 2, while an example in which the defect inspection device 100 is realized using a general computer is illustrated, the realization is not limited thereto. Thus, all or some of the functions of the defect inspection device 100 may be realized using a dedicated circuit (for example, an application specific integrated circuit (ASIC), a field-programmable gate array (FPGA), or the like). In addition, an external device connected to a network may be responsible for a part of the process.

<2. Functional Configuration of Defect Inspection Device 100>

Figure 3:
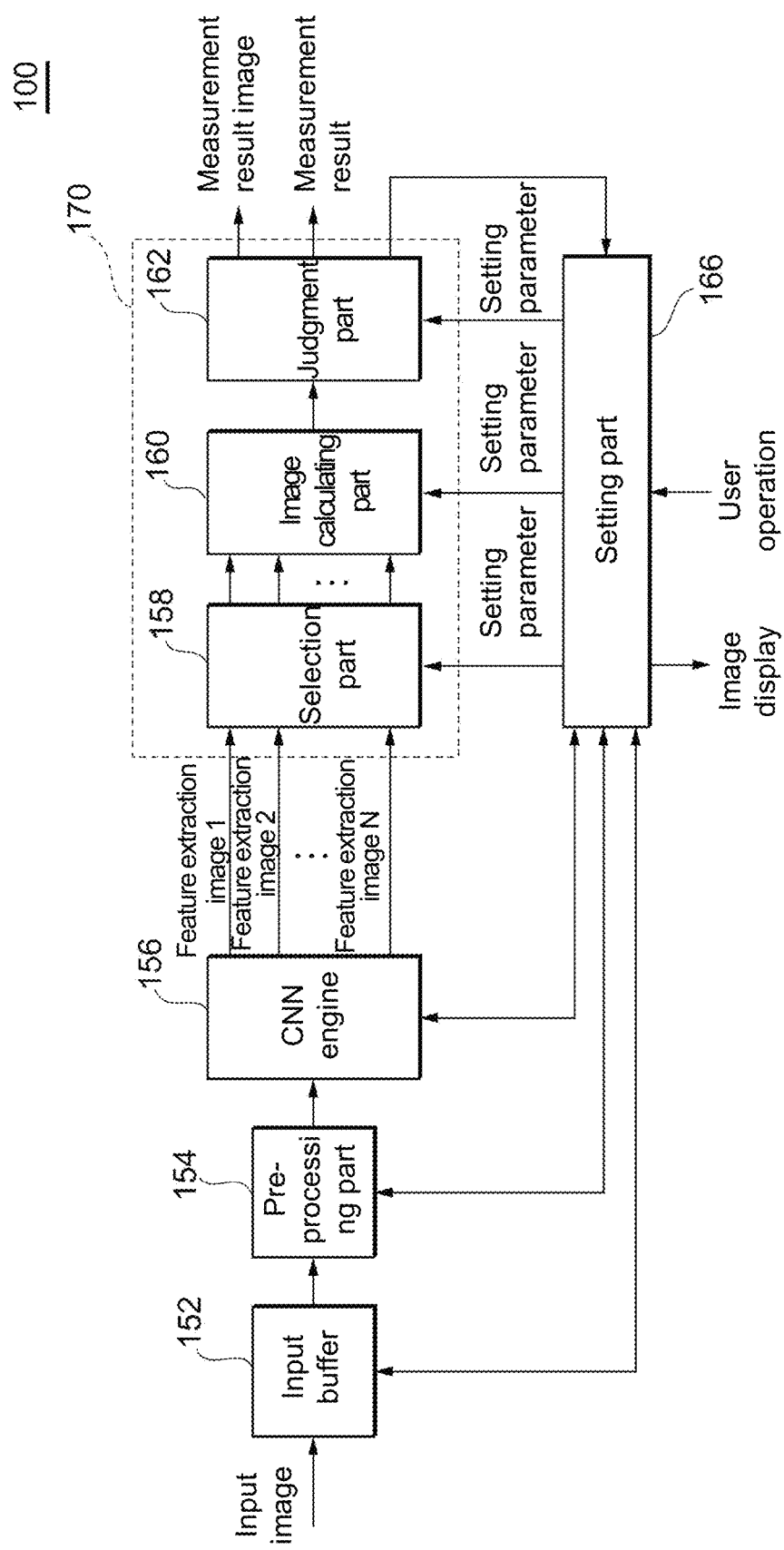
FIG. 3 is a schematic diagram illustrating the functional configuration of a defect inspection device according to this embodiment.

Next, the functional configuration of the defect inspection device 100 included in the defect inspection system 1 according to this embodiment will be described with reference to FIGS. 3 and 4. In FIG. 3, the CNN engine 156 corresponds to an image generating part, and the post processing part 170 (particularly, the judgment part 162) corresponds to an inspection part.

FIG. 3 is a schematic diagram illustrating the functional configuration of the defect inspection device 100 according to this embodiment. Each functional configuration included in the defect inspection device 100, typically, is an arithmetic operation process realized by the processor 110 described above executing the image processing program 132. FIG. 4 is a schematic diagram illustrating one example of an inspection process (operation process) executed by the defect inspection device 100 according to this embodiment.

Referring to FIG. 3, the defect inspection device 100 includes an input buffer 152, a pre-processing part 154, a CNN engine 156, a post-processing part 170, and a setting part 166 as functional components. Hereinafter, each of the functional components will be described in detail.

(2-1. Input Buffer 152)

The input buffer 152 temporarily stores an input image captured by the camera 102. The processor 110 stores the input image in the storage 130, whereby the input buffer 152 is realized. The pre-processing part 154 and the setting part 166 can access the input buffer 152.

(2-2 Pre-Processing Part 154)

The pre-processing part 154 executes a necessary pre-process for the input image stored in the input buffer 152. The pre-processing part 154 according to this embodiment generates a pre-processing filter when an inspection process is established (hereinafter, also referred to as a "preparation process"). The pre-processing filter, for example, is a parameter (filter parameter) used for converting the input image. As specific examples of the pre-processing filter, there are a brightness correction, a color-gray conversion, enlargement/contraction of an input image to be described later, and the like. The pre-processing filter may be appropriately applied to the input image in accordance with an aspect.

The CNN engine 156 to be described later has acquired internal parameters used for extracting a predetermined feature extraction image through advance learning. Accordingly, the CNN engine 156 can extract features falling within a width of feature quantities defined by the internal parameters. However, a range of feature quantities corresponding to the internal parameters is determined depending on the type of defect included in learning data used for generating a learning-completed model. Thus, when a defect having a peculiar feature not included in the learning data occurs in the production line, there are cases in which a feature quantity of the defect deviates from a feature quantity acquired through the advance learning, and erroneous recognition (overlooking) occurs. In addition, when a pattern of a background area having a peculiar feature not included in the learning data in the production line occurs, there are cases in which the pattern of the background area coincides with the range of feature quantities acquired through the advance learning, and erroneous recognition (excessive extraction) occurs.

Thus, the pre-processing part 154 generates a pre-process filter capable of converting an input image as follows in the preparation process. The input image is enlarged or contracted such that a width of feature quantities of an area corresponding to a defect included in the input image is included in the range of feature quantities corresponding to the internal parameter. The input image is enlarged or contracted such that a feature of an area that is not a defect included in the input image does not enter a feature quantity extracted by the internal parameter.

Then, in a process in which an inspection is executed actually (hereinafter, also referred to as an "operation process"), a conversion of the input image is executed by applying the pre-processing filter to the input image as a pre-process (S1 in FIG. 4). Such a pre-process is for the purpose of processing the input image such that extraction of features can be easily executed by the CNN engine 156 disposed at a later stage. Details of the pre-process may be designated by a user through the setting part 166. The input image after the pre-process (hereinafter, referred also to as a "pre-process completed image) is output to the CNN engine 156 (S2 in FIG. 4).

(2-3. CNN Engine 156)

The CNN engine 156 provides a feature extraction image generating function of generating a plurality of feature extraction images corresponding to a plurality of classes by applying the CNN engine 156 having the plurality of classes learned in advance to the input image. The plurality of feature extraction images generated by the CNN engine 156 are output to the post-processing part 170 and can be accessed from the setting part 166 as well.

Hereinafter, the function of the CNN engine 156 will be described in more details. The CNN engine 156 is configured to output a probability prob(n) that the input image belongs to a plurality of classes (classification: n) designated in advance in a case in which an image is input. The probability is calculated for each of the plurality of classes (classifications) designated in advance. The CNN engine 156 according to this embodiment outputs a probability prob(n) representing that an input image is an image belonging a specific class acquired through the advance learning and feature extraction images (a feature extraction image 1, a feature extraction image 2, . . . , a feature extraction image N) belonging to the class (S3 in FIG. 4). In this embodiment, there are five classes including a background, a black point, a white point, a black line, and a white line as the plurality of classes. By inputting an input image captured by the camera 102 or the like to the CNN engine 156, feature extraction images acquired by extracting features classified into such classes of "while point," "black point," "white line," and "black line" are generated. Feature extraction images illustrated in FIG. 4 are displayed such that a density difference between an area representing each feature and other areas becomes large. As examples of displaying a density difference to be large, a form in which the area is displayed to be brighter than the other areas and a form in which the area is displayed to be darker than the other areas may be included. However, the forms are not limited to these, and any form may be used as long as an area having a predetermined feature can be distinguished in accordance with the form.

As described above, the CNN engine 156 acquires an internal parameter used for generating feature extraction images corresponding to each class through advance learning. For example, in a case in which the class of the "white line" or the "black line" is to be extracted, the internal parameter may be represented as the number of pixels of a width of a defect that can be extracted. The internal parameter is acquired in accordance with a type of defect included in a learning image given through advance learning.

The CNN engine 156 according to this embodiment includes one or a plurality of convolution layers (L1~L3, for example), one or a plurality of pulling layers, a fully-combined layer (L4 and L5, for example), and a soft max layer (L6, for example). Information of each image as an input image is output to the fully-combined layer through the plurality of convolution layers and the plurality of pulling layers. Features of the image are extracted through a convolution process using the convolution layers and an image size compressing process using the pulling layers.

The fully-combined layer combines image data from which features have been extracted with a specific node through the convolution layers and the pulling layers and outputs feature variables converted using a predetermined function. Each node disposed in the fully-combined layer becomes image data corresponding to the plurality of classes designated in advance.

The output of the fully-combined layer is output to the soft max layer (output layer). The soft max layer outputs a probability prob(n) of belonging to one of the plurality of class classifications (n) designated in advance in the range of 0 to 1.

Calculation equations of the convolution layer and the fully-combined layer are as represented respectively in Equation (1) and Equation (2). In each of the equations, a plurality of weighting factors W and a bias B are hyper parameters included in the internal parameters, and such internal parameters are determined through learning. In addition, a calculation equation of the soft max layer is represented in Equation (3).

Calculation equations of convolution layer $$I_{top}(X,Y,n) = \sum_{c=0}^{C-1} \sum_{y=0}^{K_y-1} \sum_{x=0}^{K_x-1} W(x,y,c,n) \cdot I_{btm}(X+x, Y+y, c) + B(n) \quad \text{Equation(1)}$$

$I_{top}(X,Y,n)$: Output image
$I_{btm}(x,y,c)$: Input image
$W(x,y,c,n)$: Coefficient of convolution
$B(n)$: Bias
$K_x, K_y$: Size of kernel of convolution
$C$: Number of channels of input image Calculation equations of fully-combined layer $$I_{top}(n) = \sum_{c=0}^{C-1} w(c,n) \cdot I_{btm}(C) + B(n) \quad \text{Equation (2)}$$

Figure 5A:
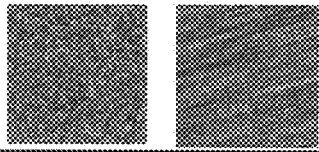
FIG. 5A is a diagram illustrating one example of a learning data set given to a CNN engine according to this embodiment.
Figure 5A:
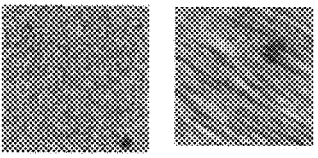
Figure 5A:
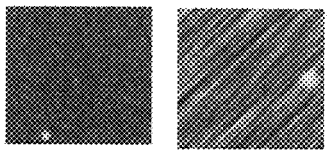
Figure 5A:
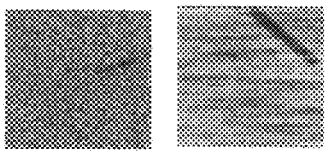
Figure 5A:

Itop(c): Output image
Ibtm(c): Input image
W(c,n): Coefficient of fully-combination
B(n): Bias
C: Number of channels of input image
Calculation equations of soft max layer $$prob(n) = \frac{\exp(I_{btm}(n))}{\sum_{i=0}^{N-1} \exp(I_{btm}(i))} \qquad \text{Equation (3)}$$

prob(n): Probability (0 to 1) belonging to n-th classification
Ibtm(c): Input image
N: number of classifications Next, the learning executed by the CNN engine 156 according to this embodiment will be described. One example of a learning data set including a learning image and teacher data (label) used in this embodiment is illustrated in FIG. 5A. In addition, a schematic learning process using the learning data and the teacher data set illustrated in FIG. 5A is illustrated in FIG. 5B.

As illustrated in FIG. 5A, the learning data includes a learning image corresponding to a plurality of classes (classification: n) designated in advance. In this embodiment, as illustrated in FIG. 5A, a plurality of learning images corresponding to five types of class including a background, a defect represented by a black point, a defect represented by a white point, a defect represented by a black line, and a defect represented by a white line are prepared. In addition, teacher data (label) representing a classification of each piece of image data is assigned using numbers 0 to 4 to each piece of learning image data. More specifically, 0 is assigned to the background, 1 is assigned to a defect represented by the black point, 2 is assigned to a defect represented by the white point, 3 is assigned to a defect represented by the black line, and 4 is assigned to a defect represented by the white line.

Figure 5B:
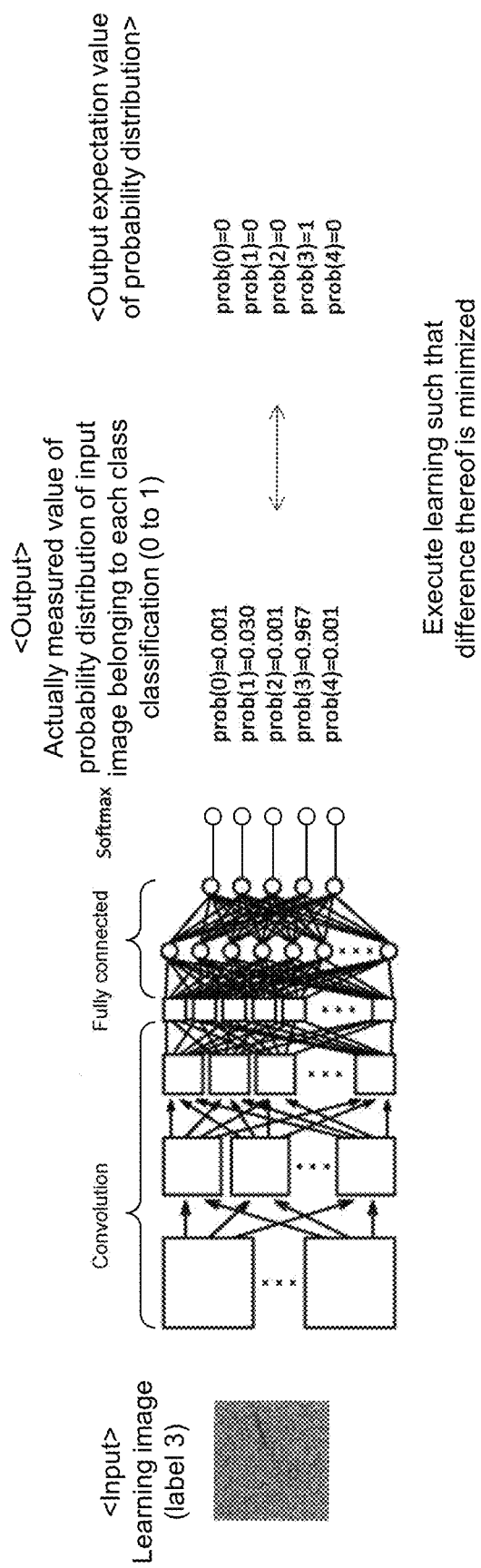
FIG. 5B is a schematic diagram illustrating input/output at the time of executing learning and expectation values of a CNN engine according to this embodiment.
Figure 6:
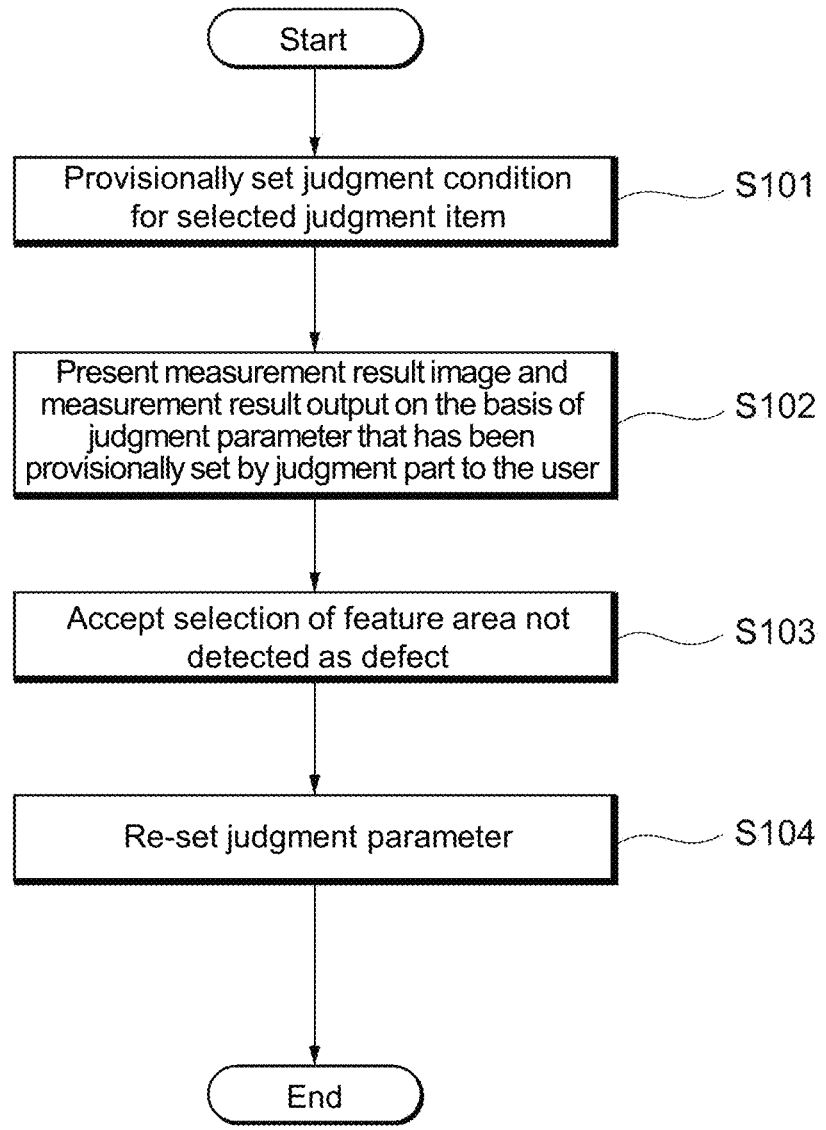
FIG. 6 is a flowchart illustrating one example of a semi-automatic setting mode in a defect inspection system according to this embodiment.

As illustrated in FIG. 5B, in the learning executed by the CNN engine, first, values of all the hyper parameters configuring the inside of the CNN are initialized using random numbers. Subsequently, a learning image included in the learning data set illustrated in FIG. 5A is input to the CNN engine 156, and a probability distribution prob(n) is output. Subsequently, an actually-measured value prob(n) of the probability distribution output by the CNN engine 156 is compared with an output expectation value of the probability distribution. Here, the output expectation value of the probability distribution becomes a probability distribution prob(n)=1 of a label corresponding to the input learning image and becomes a probability distribution prob(n)=0 of a label not corresponding to the input learning image. As illustrated in FIG. 5B, in a case in which an input image includes a defect represented by a black line, and 3 is associated as the teacher data (label), an output expectation value of the probability distribution is prob(3)=1, and an output expectation value of the other probability distribution is prob(n: 0, 1, 2, 4)=0. Accordingly, the learning executed by the CNN engine 156 is a process in which a combination of hyper parameters is searched and updated such that a difference between an actually-measured value of the probability distribution output by the soft max layer and an output expectation value of a label corresponding to the learning image is minimal in a case in which a certain learning image is input.

The update of hyper parameters is executed by calculating a probability distribution prob(n) using a plurality of learning images and repeatedly calculating values of the hyper parameters such that a loss function represented in the following Equation (4) is minimized with a sum of cross entropies of the actually-measured value of the probability distribution and the output expectation value used as the loss function. At this time, for the calculation of the hyper parameters, a gradient descent method and an error back propagation method may be used. In a case in which a difference between the hyper parameters before and after the update becomes less than a predetermined value, the learning is completed.

Calculation equations of loss function (cross entropy)

$$\text{Loss} = \sum_{i=0}^{Cnt} \sum_{n=0}^{N-1} \{ex(n)\cdot\log[prob(n)] + (1-ex(n))\cdot\log[1-prob(n)]\} \qquad \text{Equation (4)}$$

prob(n): Actually-measured value of probability belonging to n-th classification
ex(n): Expectation value of probability belonging to n-th classification
N: Number of classifications
Cnt: Number of learning images (2-4. Post-Processing Part 170)

The post-processing part 170 generates a measurement result image by performing a post-process for at least some feature extraction images among the plurality of feature extraction images output from the CNN engine 156. More specifically, the post-processing part 170 selects one or a plurality of feature extraction images that have been designated among the plurality of feature extraction images output by the CNN engine 156 and executes a post-process therefor, thereby outputting a measurement result image (S4 in FIG. 4). As the selection of one or the plurality of feature extraction images, user's designation may be accepted through the setting part 166 as illustrated in FIG. 3. In addition, the post-processing part 170 may output a measurement result together with the measurement result image. The measurement result includes a judgment result (for example, presence/absence of a defect, a size of a defect pattern, a position of a defect pattern, and the like) acquired when a defect inspecting process is executed for an input image.

In this embodiment, the post-processing part 170 is composed of a selection part 158, an image calculating part 160, and a judgment part 162.

The selection part 158 selects one or a plurality of feature extraction images among the plurality of feature extraction images output from the CNN engine 156 and outputs the selected feature extraction images to the image calculating part 160. In addition, when feature extraction images are selected, the selection part 158 may accept user's selection through the setting part 166 to be described later.

In a case in which the selection part 158 selects a plurality of feature extraction images, the image calculating part 160 executes predetermined image processing as necessary and outputs a result thereof to the judgment part 162. Here, an image calculating process includes execution of an arbitrary mathematical process including four arithmetic operations between corresponding pixels among a plurality of images. More specifically, for example, the image calculating part 160 can execute an addition process between images, a subtraction process between images, and a weighted calculation process using two or more feature extraction images among the plurality of selected feature extraction images as the image calculating process.

Figure 4:
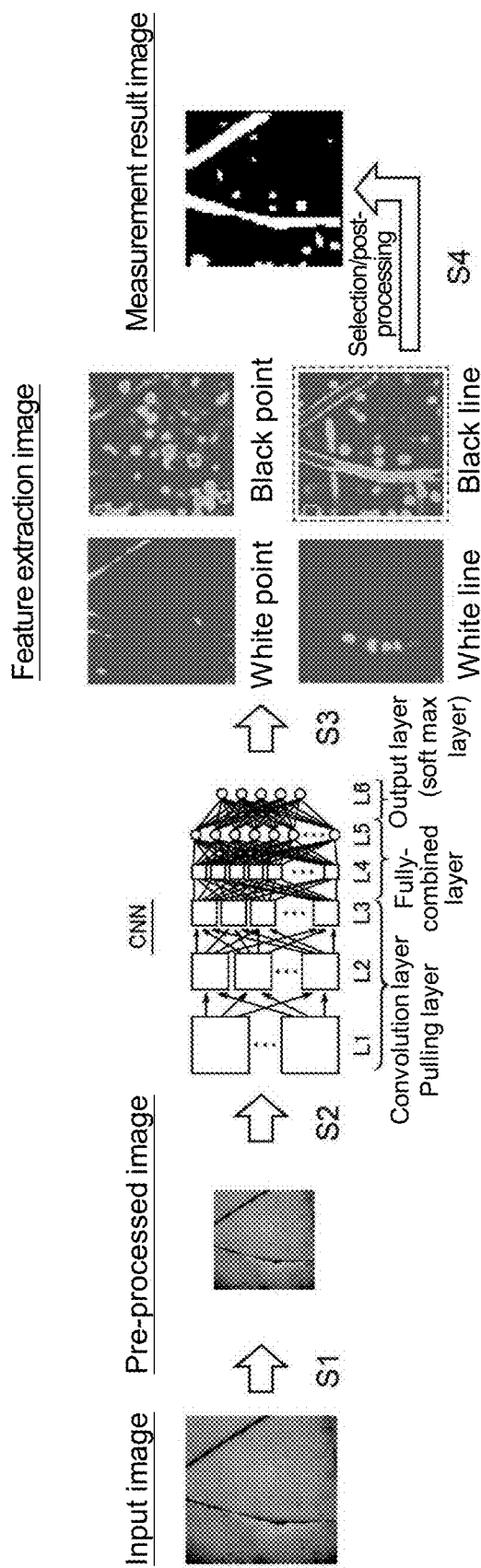
FIG. 4 is a diagram illustrating one example of the process sequence of an image measuring process using a convolutional neural network (CNN) in a defect inspection system according to this embodiment.

FIG. 4 illustrates an example in which a feature extraction image of the "black line" is selected by the selection part 158 as the most appropriate feature extraction image. However, in this example, a feature corresponding to a "black point" also appears inside the feature extraction image of the "black line." In other words, in both the feature extraction image of the "black line" and the feature extraction image of the "black point," a point-shaped feature part commonly appears. When the input image is taken into account, a feature corresponding to this "black point" represents not a defect but a noise. In this way, depending on a type and a size of a feature included in the input image, it is difficult to execute pattern separation between a defect and a part other than a defect (for example, a background part or a noise). At this time, by executing an image calculating process such that features appearing in another feature extraction image are subtracted from one feature extraction image, the image calculating part 160 can extract only target features. In other words, in the example illustrated in FIG. 4, the image calculating part 160 executes a process of acquiring a difference between a luminance value of each pixel configuring the feature extraction image of the "black line" and a luminance value of each pixel configuring the feature extraction image of the "black point." Meanwhile, there are cases in which a feature corresponding to a defect appears to be distributed in feature extraction images of a plurality of classes. For example, there are cases in which a plurality of scratch-form defects are generated in an inspection target object, one scratch-form is extracted to a feature extraction image of the "white line" in accordance with lighting conditions, and the other scratch-form defect is extracted to a feature extraction image of the "black line." In such cases, the image calculating part 160 may execute an addition process between the feature extraction image of the "white line" and the feature extraction image of the "black line." In this way, by executing an addition/subtraction process between images and a weighted calculation process for the plurality of feature extraction images that have been selected, an image including features to be extracted as defects can be generated.

In addition, in a case in which the selection part 158 selects only one feature extraction image, the image calculating part 160 may directly output the feature extraction image to the judgment part 162 without executing an image calculating process. In addition, the image calculating part 160 may accept a certain image calculating process to be executed from a user through the setting part 166.

The judgment part 162 executes a binarization process and a judgment process for a feature extraction image (for which an image calculating process has been completed or has not been executed) output by the image calculating part 160 in accordance with a judgment parameter input at least from the setting part 166 to be described later and outputs a measurement result image. In addition, the judgment part 162 may output a measurement result together with the measurement result image.

In this embodiment, the judgment parameter includes at least a binarization level or judgment conditions. The binarization level is a threshold used when the judgment part 162 generates an image (binary image) acquired by binarizing an image acquired by executing image processing for a feature extraction image or a plurality of feature extraction images using the image calculating part 160 through a binarization process. In addition, the judgment conditions are information acquired by combining judgment items (for example, in the case of detection as a defect, an area of an image, a width and a height of a bounding rectangle, a circumference, an aspect ratio, circularity, and the like) representing types of feature quantities used for a judgment on whether or not a defect is included in a binary image by the judgment part 162 and judgment thresholds representing ranges of feature quantities that are set in the judgment items and detected as defects. An upper limit and a lower limit of the judgment threshold is set. In addition, a judgment item included in the judgment conditions is not limited to a single item, and a plurality of judgment items may be included in the judgment conditions. In such a case, the judgment conditions represent information of a combination of a plurality of judgment items and respective thresholds set in the plurality of judgment items. In addition, the judgment parameter may further include information designating a judgment logic and the like.

In the following description, although an example in which the judgment parameter is set by the process of the setting part 166 to be described later will be described, in a case in which a learning machine that has performed machine learning or the like is used as the post-processing part 170, the judgment parameter may be configured to be acquired through advance learning. In such a case, the judgment parameter is updated with an appropriate value by the process of the setting part 166 to be described later.

Details of the binarization process and the judgment process of the judgment part 162 will be described.

The binarization process is a process, which is executed by the judgment part 162, of generating a binary image from an image (hereinafter, referred to as an "intermediate image") acquired by the image calculating part 160 executing image processing for a feature extraction image or a plurality of feature extraction images using in accordance with the binarization level included in the judgment parameter. In more details, as the binarization process, the judgment part 162, first, generates a binary image of the intermediate image output by the image calculating part 160 on the basis of the binarization level included in the judgment parameter. Here, the binarization level is, for example, a threshold relating to an intensity of a pixel. For example, a case in which the judgment part 162 generates a binary image in which densities of the feature extraction image are represented using two values of white and black will be described as an example. In this case, the density of the original feature extraction image has continuous values, and the judgment part 162 generates a binary image acquired by binarizing the feature extraction image by converting all the pixels having intensities that are equal to or higher than the binarization level into black and converting all the pixels having intensities that are lower than the binarization level into white. Here, a correspondence relation between the intensity and black/white is not limited thereto, and thus, a reverse relation may be formed.

Next, a judgment process is a process of the judgment part 162 generating a measurement result image (or a measurement result image and a measurement result) from a binary image (one example of an intermediate image) in accordance with judgment conditions included in the judgment parameter. In more details, as the judgment process, the judgment part 162 extracts a group of pixels (hereinafter, also referred to as a "first feature area) in which the same color is connected in the binary image generated through the binarization process. Then, the judgment part 162 extracts an area detected as a defect from the extracted first feature area on the basis of the judgment conditions given as the judgment parameter. Then, the judgment part 162 generates and outputs a measurement result image in which only the first feature area to be detected as a defect is extracted.

For example, in a case in which judgment conditions having an area as a judgment item are given, in a case in which the area of a certain first feature area is within the judgment threshold given as the judgment conditions, the judgment part 162 extracts the first feature area as an area detected as a defect. Then, the judgment part 162 generates a measurement result image acquired by extracting areas detected as defects from the binary image.

(2-5. Setting Part 166)

The setting part 166 sets a judgment parameter used by the judgment part 162 for a judgment process and outputs the set judgment parameter to the judgment part 162. The setting part 166 according to this embodiment has the following three types as modes for setting the judgment parameter.

Manual Mode/Semi-Automatic Mode/Full-Automatic Mode

The setting part 166 may have at least the semi-automatic mode among the setting modes described above, and it is not essential for the setting part 166 to have all the modes. A setting process for each mode will be described in detail.

(1) Manual Mode

In the manual mode, the setting part 166 accepts selection of a judgment item and a setting of a judgment threshold (an upper limit and a lower limit) set in the selected judgment item from a user as a setting of judgment conditions. In addition, in the manual mode, the setting part 166 also accepts a setting of the binarization level from the user. The setting part 166 outputs the binarization level and the judgment conditions that have been accepted to the judgment part 162 as judgment parameters.

(2) Semi-Automatic Mode

The semi-automatic mode is a mode in which the setting part 166 accepts adjustment of the parameter from a user after provisionally setting a judgment parameter and is a setting mode in which a provisional setting of the judgment parameter is automatically executed in a state in which the judgment parameter can be freely adjusted by the user. One example of the process of the setting part 166 in the semi-automatic mode will be described with reference to FIG. 6.

In the semi-automatic mode, first, the setting part 166 provisionally sets a judgment parameter and outputs the judgment parameter to the judgment part 162 (S101). More specifically, the setting part 166 may provisionally set a judgment condition on the basis of a feature of a defect included in the learning image included in the learning data set used for the learning executed by the CNN engine 156. In addition, the setting part 166 may provisionally set a judgment condition on the basis of the internal parameter acquired by the CNN engine 156. Here, various forms of defects are included in the learning image. Thus, in a case in which features of the forms of these defects, for example, an area, a length, a circumference, circularity, and the like of each defect are clear, a judgment item and judgment thresholds are set on the basis of the forms of the defects included in the learning image. According to this, a judgment condition corresponding to a distribution of forms of defects included in the learning image included in the learning data set can be set, and defects having forms equivalent to the defects included in the learning data set can be detected. In addition, the internal parameter of the CNN engine acquired using the learning data set is acquired such that various forms of defects included in the learning images are detected, and accordingly, by setting the judgment item and the judgment thresholds on the basis of the internal parameter of the CNN engine 156, a judgment condition for which defects having forms equivalent to the defects included in the learning data can be detected can be set. In this way, for example, the setting part 166 provisionally sets feature quantities corresponding to the learning images and the internal parameter as judgment thresholds. At this time, the setting part 166 provisionally sets the judgment parameter in consideration of the pre-processing filter set by the pre-processing part 154. For example, in a case in which an input image is enlarged or contracted by the pre-processing filter, the judgment thresholds for the judgment item such as the area of the first feature area is provisionally set to be increased from the internal parameter that has been learned in advance in consideration of an enlargement/contraction rate according to the pre-processing filter.

In addition, the binarization level and the judgment item may be configured to be designated from the user in advance. In this way, the provisional setting process of the judgment parameter can be executed at a high speed. In this case, in the process of S101, the setting part 166 provisionally sets judgment thresholds in the judgment parameter on the basis of the internal parameter for each judgment item designated from the user.

When the judgment parameter that has been provisionally set by the judgment part 162 is output to the judgment part 162 (S102), the judgment part 162 extracts an area coinciding with the judgment parameter that has been provisionally set from the first feature area extracted in the binary image as an area detected as a defect (hereinafter, also referred to as a "second feature area"). Then, a setting image in which the second feature areas are highlighted in the binary image is output (see FIG. 10B). The setting part 166 presents the output setting image to the user and accepts selection of a second feature area to be excluded (in other words, not to be detected as a defect) (hereinafter, also referred to as a "third feature area") among the highlighted second feature areas (S103). In addition, the judgment part 162 may be configured to present the measurement result image to the user as a setting image and accept selection of a third area from areas detected as defects in the measurement result image.

Figure 7:
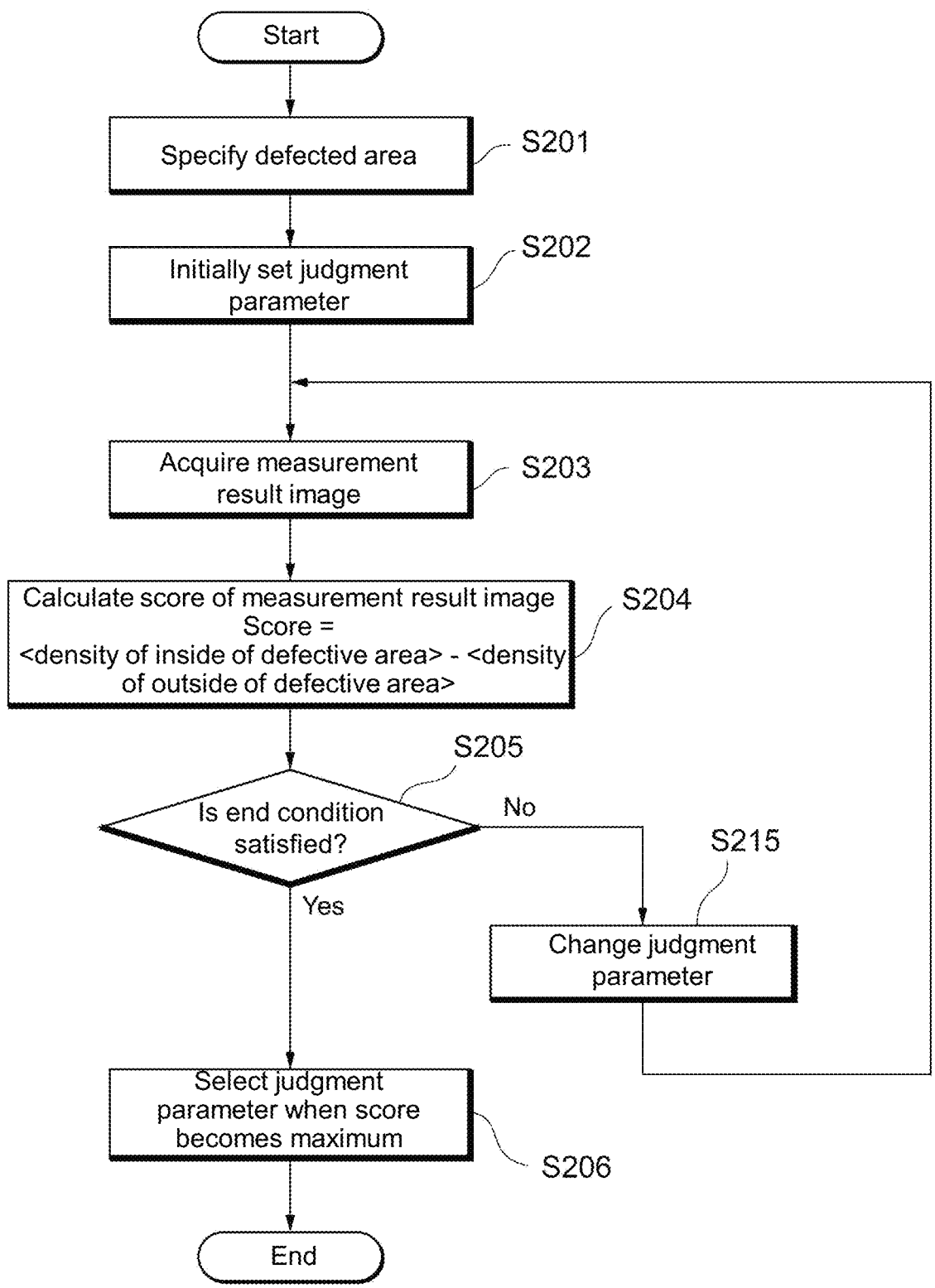
FIG. 7 is a flowchart illustrating one example of the process of an automatic/manual setting mode in a defect inspection system according to this embodiment.

Then, the setting part 166 sets a judgment condition again such that the third feature area is not detected as a defect. More specifically, the setting part 166 sets the judgment thresholds again such that a feature quantity of the third feature area is not included in the range of the judgment condition (S104). The re-setting (update) of the judgment thresholds is, as illustrated in FIG. 7, executed in accordance with a difference between image scores set on the basis of a difference of densities of colors of pixels between the inside and the outside of the area detected as a defect. At this time, the setting part 166 may select a judgment item different from the judgment item included in the judgment parameter that has been provisionally set and set judgment thresholds.

In this way, in the semi-automatic mode, by adjusting the judgment parameter that has been provisionally set in advance, an appropriate judgment parameter can be set. In this way, a setting of a judgment parameter that is appropriate for detecting a defect with a high accuracy can be easily executed.

(3) Full-Automatic Mode

In the full-automatic mode, the setting part 166 accepts designation of an area to be detected as a defect (hereinafter, referred to also as a "defective area") for an input image from a user and automatically sets the judgment parameter on the basis of the designated defective area. One example of the process of the setting part 166 in the full-automatic mode will be described with reference to FIGS. 7 to 9.

FIG. 7 illustrates one example of the process flow of the setting part 166 when a judgment parameter is automatically set on the basis of one input image.

Figure 8:
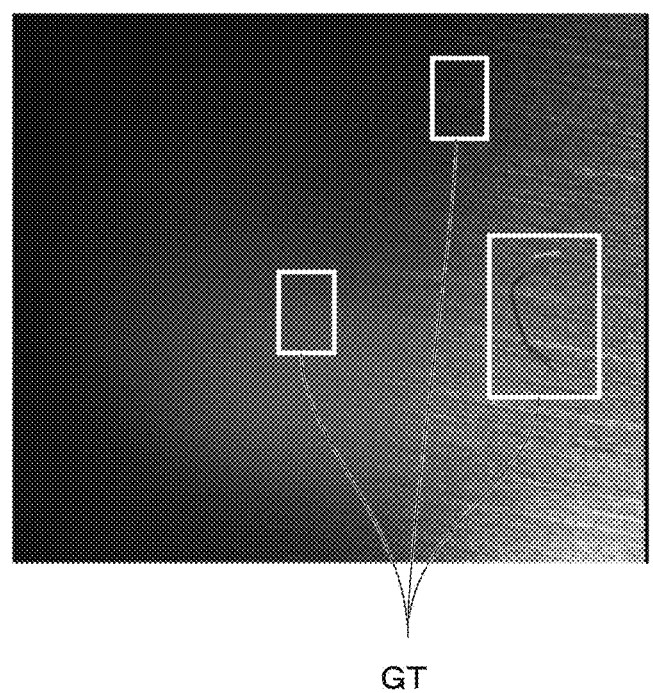
FIG. 8 is a diagram illustrating one example of a defective area in a defect inspection device according to this embodiment.

First, the setting part 166 accepts specifying a defective area for the input image from the user (S201). FIG. 8 is a diagram illustrating one example of the specified defective area. In FIG. 8, rectangles GT correspond to defective areas. In addition, a defective area is not limited to a rectangle and may have an arbitrary shape having an area.

The continuation of the flow will be described with reference back to FIG. 7.

When a defective area is designated, the CNN engine 156 generates a feature extraction image. At this time, the setting part 166 initially sets the judgment parameter (S202). The initial setting of the judgment parameter, for example, is initialization of the binarization level, selection of a judgment item, and initialization of judgment thresholds corresponding to the selected judgment item. The setting part 166 may provisionally set the binarization level and a judgment parameter including the judgment condition on the basis of the feature of the defect included in the learning image included in the learning data set used for learning executed by the CNN engine 156. In addition, the setting part 166 may provisionally set the binarization level and the judgment parameter including the judgment condition on the basis of the internal parameter acquired by the CNN engine 156. Furthermore, the designation of the binarization level and the judgment item may be configured to be accepted from the user in advance. In this way, the process of setting the judgment process can be executed at a high speed. The judgment part 162 generates a binary image on the basis of the binarization level included in the judgment parameter that has been initially set. In addition, the judgment part 162 generates a measurement result image on the basis of the judgment item and the judgment thresholds included in the judgment parameter that has been initially set.

The setting part 166 acquires the generated measurement result image (S203) and calculates a score (image score) (S204). More specifically, the setting part 166 calculates a difference between the density of the color of pixels inside a defective area and a density of the color of pixels outside the defective area in the measurement result image as a score. Here, a density of the color of a pixel can be regarded as a proportion of pixels corresponding to a feature including a defect (hereinafter, referred to as feature pixels) inside a defective area or outside the defective area (hereinafter, referred to as each target area). The ratio of feature pixels in each target area may be a quantity (the number, an area, or the like) of feature pixels included in the target area, a ratio of a total quantity of feature pixels to a total quantity of pixels not corresponding to the feature inside the target area (hereinafter, referred to as non-feature pixels), or a ratio of feature pixels or non-feature pixels to a quantity of all the pixels inside the target area. In a binary image, in a case in which a white pixel corresponds to a feature area, a black pixel corresponds to a non-feature area. In this case, by regarding the density of the color of pixels inside the defective area as the number of white pixels inside the defective area and regarding the density of the color of pixels outside the defective area as the number of white pixels outside the defective area, a difference between both the densities can be calculated as a score. In a case in which a density value corresponding to the color of each pixel (for example, "1" is set for white, and "0" is set for black) is set in advance, a sum value of density values of pixels disposed inside each target area may be calculated as a first image score. As described above, the measurement result image is an image acquired by extracting a second feature area from a first feature area included in the binary image. Accordingly, in a case in which the second feature area is appropriately extracted inside a defective area (in other words, overlooking of the defect does not occur), the density inside the defective area increases. On the other hand, in a case in which a second feature area is not extracted outside the defective area (in other words, in a case in which excessive extraction does not occur), the density outside the defective area decreases. In other words, in a case in which the judgment parameter is set most appropriately, a difference (score) between the density inside the defective area and the density outside the defective area becomes maximum. Accordingly, by calculating scores and comparing the scores with each other, the setting part 166 can search for an appropriate judgment parameter.

For this reason, the setting part 166 repeatedly executes the processes of S203 and S204 until an end condition is satisfied (S205) while changing the judgment parameter (S215). The end condition, for example, is a case in which scores are calculated for all the possible judgment thresholds that may be taken, a case in which the scores converge to a certain value score, or the like. In addition, the end condition may be set as an elapsed time after starting the flow of this process or a threshold of the number of trials of the processes of S203 and S204.

For example, the setting part 166 may fix the binarization level and the judgment item, repeat the processes of S203 and S204 while variously changing the judgment thresholds, and then may set the next judgment item and repeat the processes of S203 and S204 while variously changing the judgment thresholds. In addition, all the binarization level, the judgment item, and the judgment thresholds may be changed every time when the processes of S203 and S204 are repeated.

In a case in which it is determined that the end condition is satisfied (S205: Yes), the setting part 166 selects a judgment parameter for which the score becomes a maximum and updates the judgment parameter with the selected judgment parameter (S206). A judgment parameter for which the score is the maximum does not necessarily need to be selected from among all the judgment parameters that may be taken. For example, a maximum score t among scores calculated within a predetermined elapsed time or within a predetermined number of times of trials and a judgment score corresponding to the score may be selected. In other words, a judgment parameter from which a score relatively higher than that of the judgment parameter set when the flow of this process is started may be configured to be selected. Here, in a case in which judgment items of the judgment parameter when the score becomes the maximum are an area, a width and/or a height of a bounding rectangle, a circumference, an aspect ratio, and circularity, the judgment threshold when the score becomes the maximum is used as a lower limit value. In addition, in a case in which a judgment item of the judgment parameter when the score becomes the maximum is circularity, the judgment threshold when the score becomes the maximum is used as an upper limit value. In a case in which a plurality of defective areas are specified for one image and in a case in which, for each of the defective areas, a judgment threshold is calculated such that a difference between image scores of the inside and the outside of the area becomes a maximum, a maximum value and a minimum value among a plurality of calculated judgment thresholds may be set as an upper limit value or a lower limit value of the judgement threshold in accordance with a type of judgment item.

Figure 9:
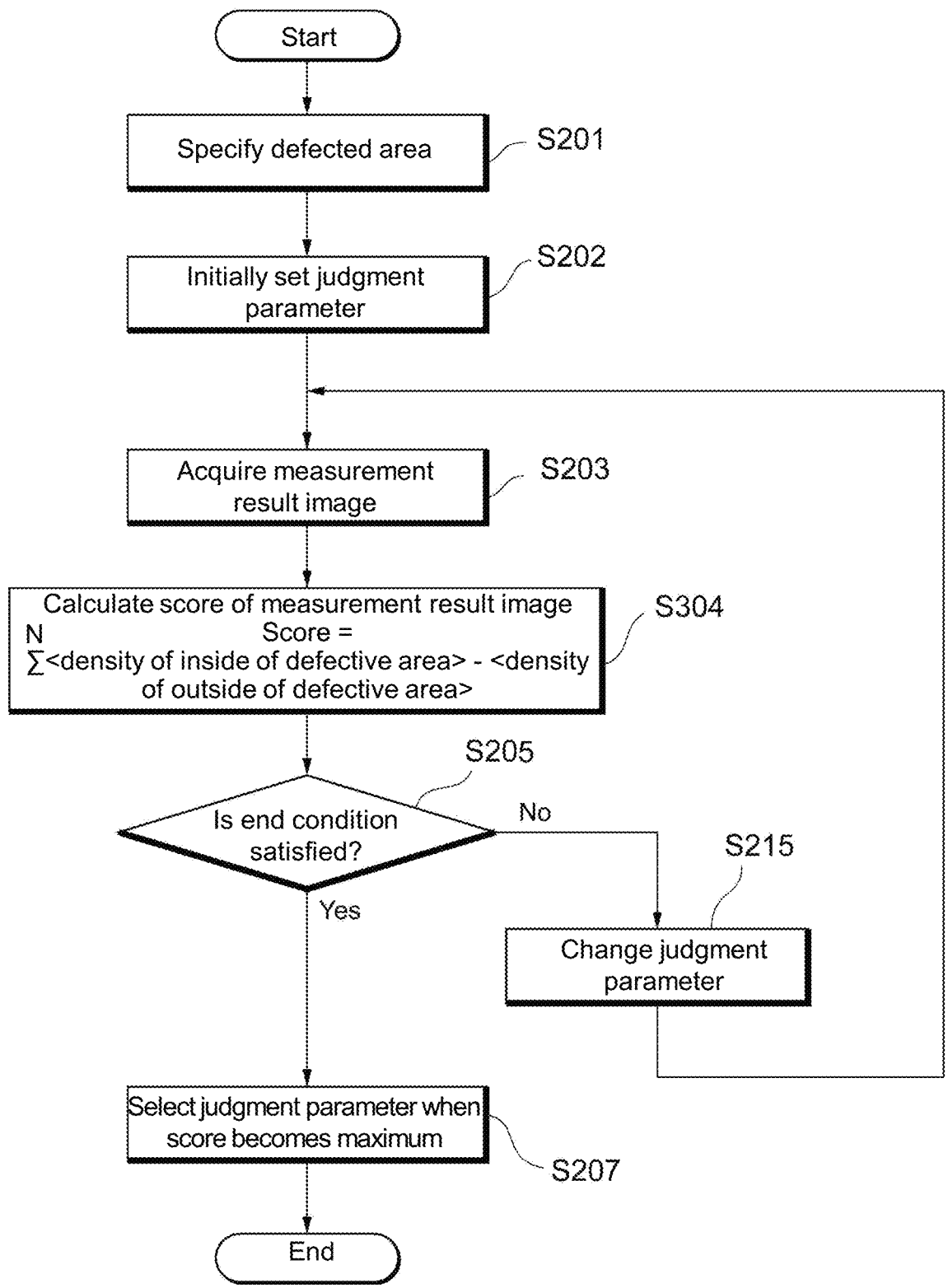
FIG. 9 is a flowchart illustrating one example of the process of an automatic/manual setting mode in a defect inspection system according to this embodiment.

FIG. 9 is one example of the process flow of the setting part 166 when a judgment parameter is automatically set on the basis of a plurality of input images. The process performed in a case in which a plurality of input images are used will be described with reference to FIG. 9 with differences from the case illustrated in FIG. 7 focused on.

In this case, the setting part 166 accepts designation of defective areas for all the plurality of input images in S201.

In addition, the setting part 166 acquires a measurement result image of each of the plurality of input images from the judgment part 162 in S203. Then, a difference between a density of the inside of the defective area and a density outside the defective area is calculated for each measurement result image, and a sum value of differences calculated for the input images is calculated as a score (S304). The other processes are similar to those of the flow illustrated in FIG. 7. By setting a judgment parameter using the plurality of input images, the accuracy of detection of a defect can be further improved.

In this way, in the full-automatic mode, a user can automatically set an appropriate judgment parameter by only specifying an area desired to be detected as a defect.

<4. Example of User Interface Screen>

Next, several examples of a user interface screen that is provided by the defect inspection device 100 according to this embodiment and is displayed on the display part will be described with reference to FIGS. 10A to 10D.

Figure 10A:
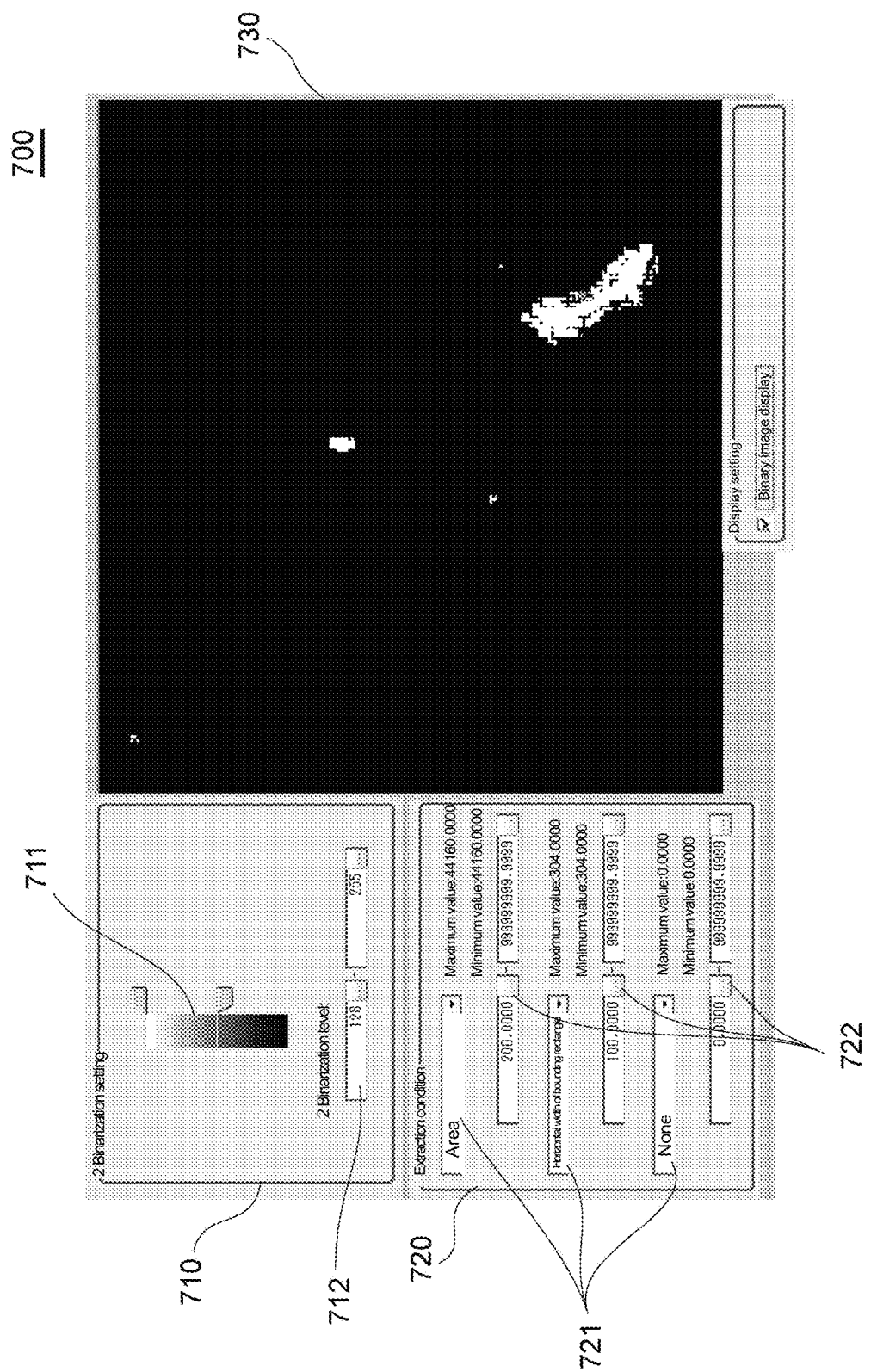
FIG. 10A is a schematic diagram illustrating one example of a user interface screen 200 provided by a defect inspection device according to this embodiment.

FIG. 10A is a schematic diagram illustrating one example of a manual setting screen 700 provided by the defect inspection device 100 when a judgment parameter is set. The manual setting screen 700 includes a binarization level setting section 710, a judgment condition setting section 720, and a measurement result image display section 730. The manual setting screen 700 is mainly used in the manual mode.

The binarization level setting section 710 includes a binarization controller 711 and a binarization level display field 712. A user can set a threshold and an upper limit of the binarization level from the binarization level controller 711. The set binarization level is displayed in the binarization level display field 712.

The judgment condition setting section 720 includes a judgment item selection field 721 and a judgment threshold setting field 722. A user can select a judgment item desired to be designated as a judgment condition, for example, through pull-down or the like from the judgment item selection field 721. In the example illustrated in FIG. 10A, although there are three types of judgment item that can be set, the judgment item is not limited thereto. Thus, the manual setting screen 700 may include an interface in which an arbitrary number of judgment items can be set. In addition, a user can set a judgment condition by setting an upper limit and a lower limit of the judgment threshold in the judgment threshold setting field 722 of a corresponding judgment item.

In the measurement result image display section 730, a measurement result image generated by the judgment part 162 on the basis of the set judgment parameter is displayed.

Figure 10B:
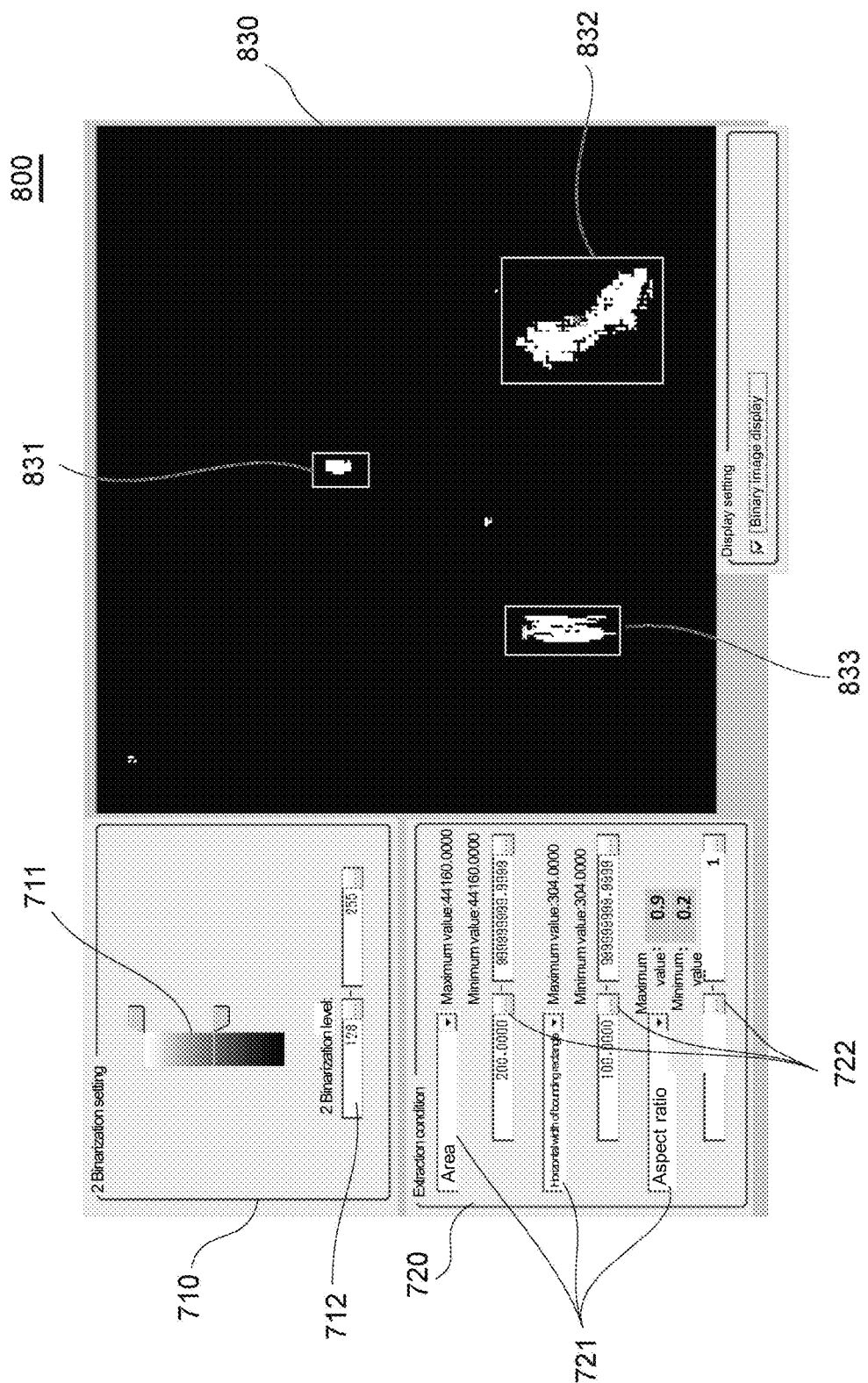
FIG. 10B is a schematic diagram illustrating one example of a user interface screen 200 provided by a defect inspection device according to this embodiment.
Figure 10C:
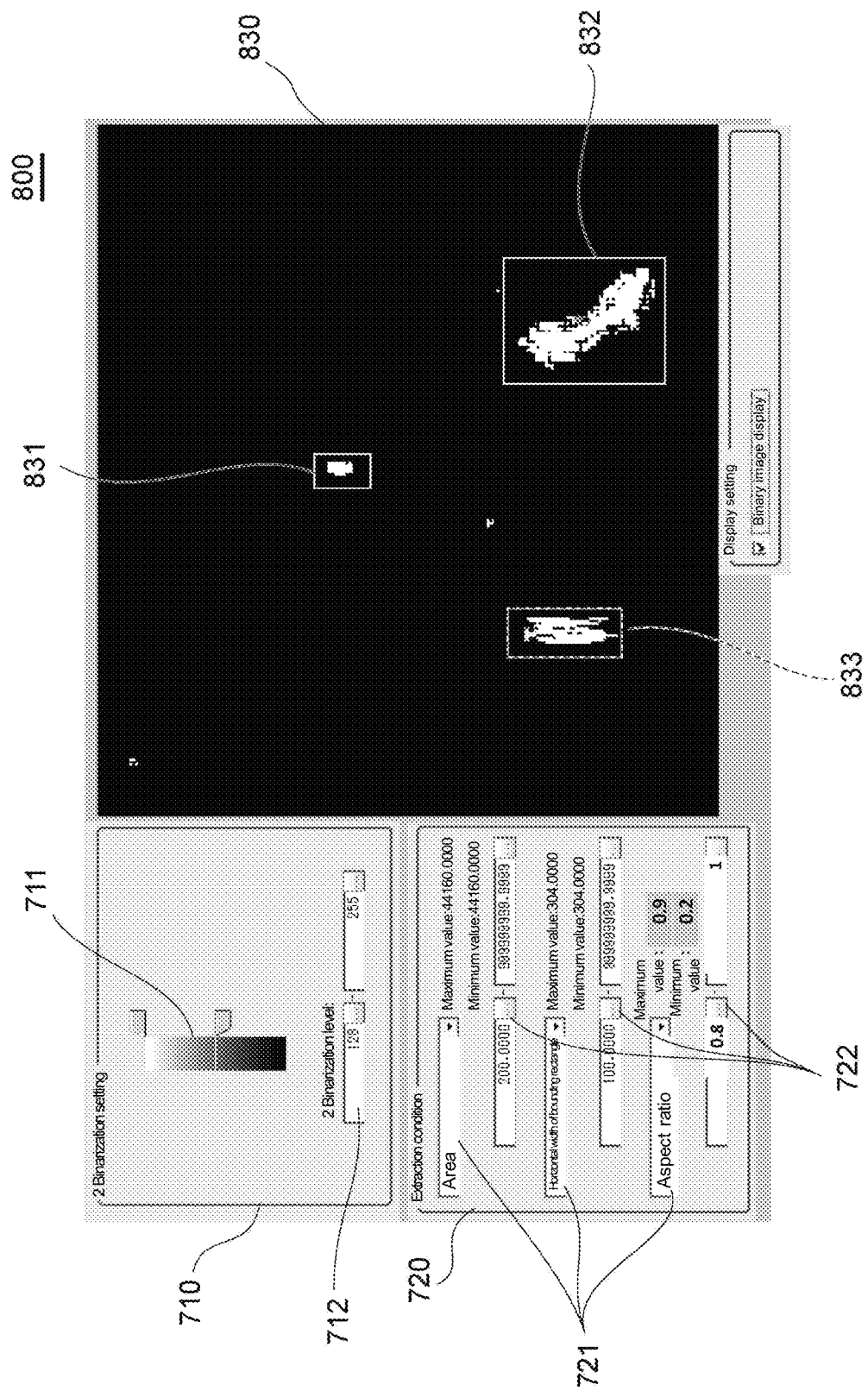
FIG. 10C is a schematic diagram illustrating one example of a user interface screen 200 provided by a defect inspection device according to this embodiment.

FIGS. 10B and 10C are schematic diagrams illustrating examples of a semi-automatic setting screen 800 provided by the defect inspection device 100 when a judgment parameter is set. A third feature area selection section 830 and the above-described binarization level setting section 710 and judgment condition setting section 720 are included. The semi-automatic setting screen 800 is mainly used in the semi-automatic mode. In a case in which a defective area for an inspection image is specified in advance, the semi-automatic setting screen 800 may be used for an operation of specifying a defective area in the full-automatic mode.

Although the functions of the binarization level setting section 710 and the judgment condition setting section 720 are as described above, on the semi-automatic setting screen 800, a judgment parameter that has been provisionally set has been set in advance and is displayed.

In the third feature area selection section 830, a setting image generated by the judgment part 162 on the basis of the judgment parameter that has been provisionally set is displayed. In this setting image, second feature areas are highlighted by being surrounded by frames 831 to 833 (FIG. 10B). A user can select one of the highlighted second feature areas that is designated as a third feature area. FIG. 10C illustrates one example of a screen display in a case in which the second feature area surrounded by the frame 833 in FIG. 10B is selected as a third feature area. When the third feature area is selected, the judgment parameter is updated, and the judgment parameter displayed in the binarization level setting section 710 and the judgment condition setting section 720 changes. In the example illustrated in FIG. 10C, a lower limit value of the aspect ratio that is the judgment item changes from 0 (FIG. 10B) to 0.8 (FIG. 10C). In addition, at this time, not only the judgment threshold and the binarization level but also, for example, the judgment item selected in the judgment condition setting section 720 may change.

FIG. 10D is a schematic diagram illustrating one example of an automatic setting screen 900 provided by the defect inspection device 100 according to this embodiment. In the example illustrated in FIG. 10D, the automatic setting screen 900 includes a diagram registration area 901, a coordinate input area 902, and a display area 903.

The diagram registration area 901 includes a diagram button 911. A user can select a diagram used for specifying a defective area by selecting a button of a diagram having a desired shape from the diagram button 911. In the example illustrated in FIG. 10D, as the diagram buttons 911, although a square, a circle, a pentagon, a circular arc, and a concentric circle are displayed, the diagram button is not limited thereto, and an arbitrary diagram may be set. In addition, a method of selecting a diagram is not limited to a button, and a pull-down, a check box, a radio button, or the like may be used.

The coordinate input area 902 accepts an input of coordinates of a defective area. In the example illustrated in FIG. 10D, a user can designate a defective area GT by inputting coordinates of the upper left side and the upper right side of the defective area in the coordinate input area 902. The defective area GT designated by the user is displayed in the display area 903.

In addition, a method of designating a defective area is not limited to that illustrated in the example of FIG. 10D. For example, a defective area may be configured to be input by directly drawing in an image displayed in the display area 903.

§ 3 Operation Example

Next, an operation example of the defect inspection system 1 according to this embodiment will be described. In the defect inspection system 1 according to this embodiment, there are the preparation process for setting a judgment parameter relating to an image measuring process and the operation process in which the image measuring process is executed by actually imaging a work piece that is a target. In addition, the process sequence of the preparation process and the process sequence of the operation process may be selected by a user using the input part described above. In addition, in the process sequence of the operation process, a process of updating the set pre-processing filter in accordance with details of an inspection result (for example, information of presence/absence of a defect, the size of an area corresponding to the defect, the position of the area, and the like) may be executed. For example, in the process sequence of the operation process, in a case in which no-detection of a defect occurs a predetermined number of times, the judgment parameter described above may be updated in one of setting modes.

Figure 11:
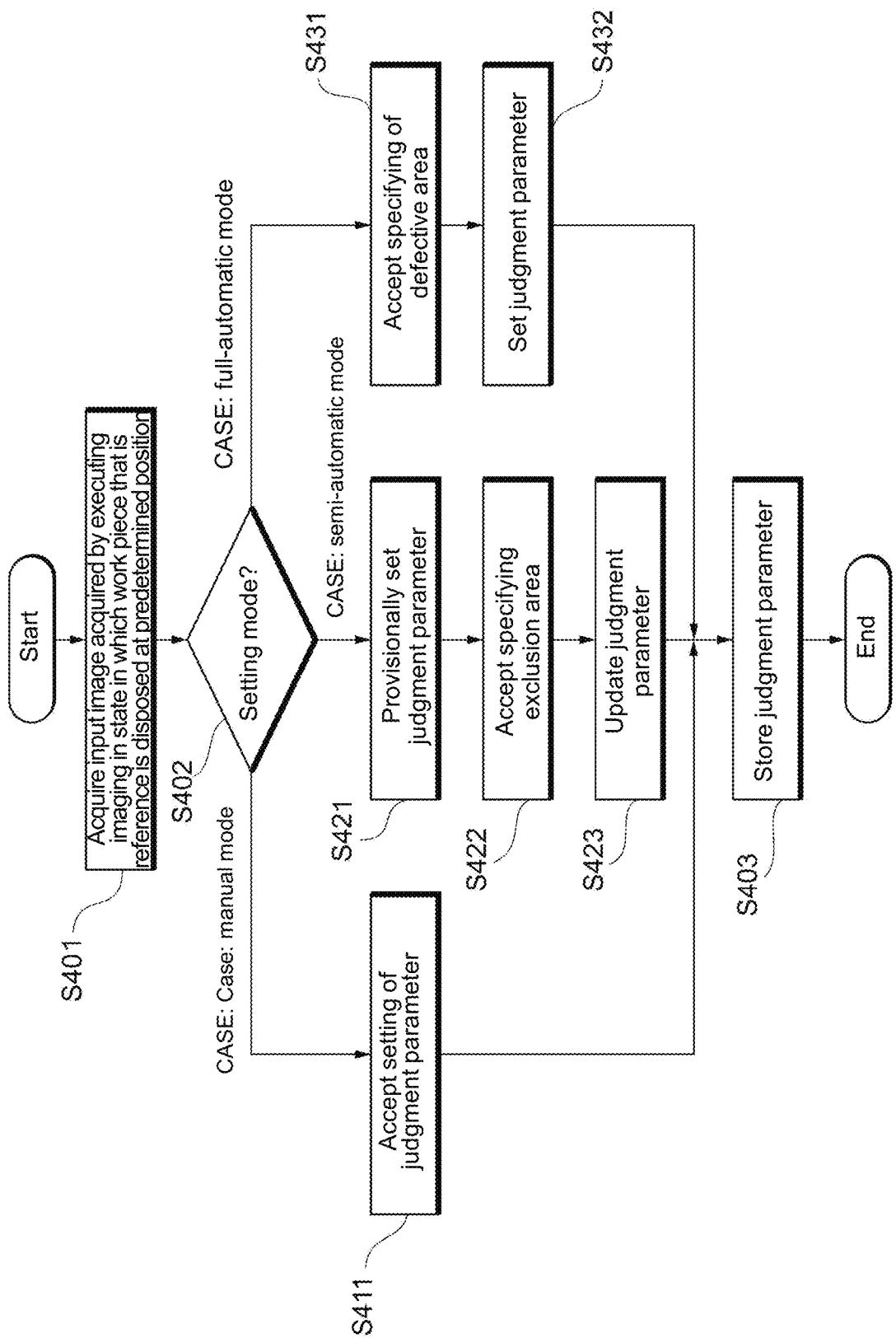
FIG. 11 is a flowchart illustrating the process sequence of a preparation process in a defect inspection system according to this embodiment.
Figure 12:
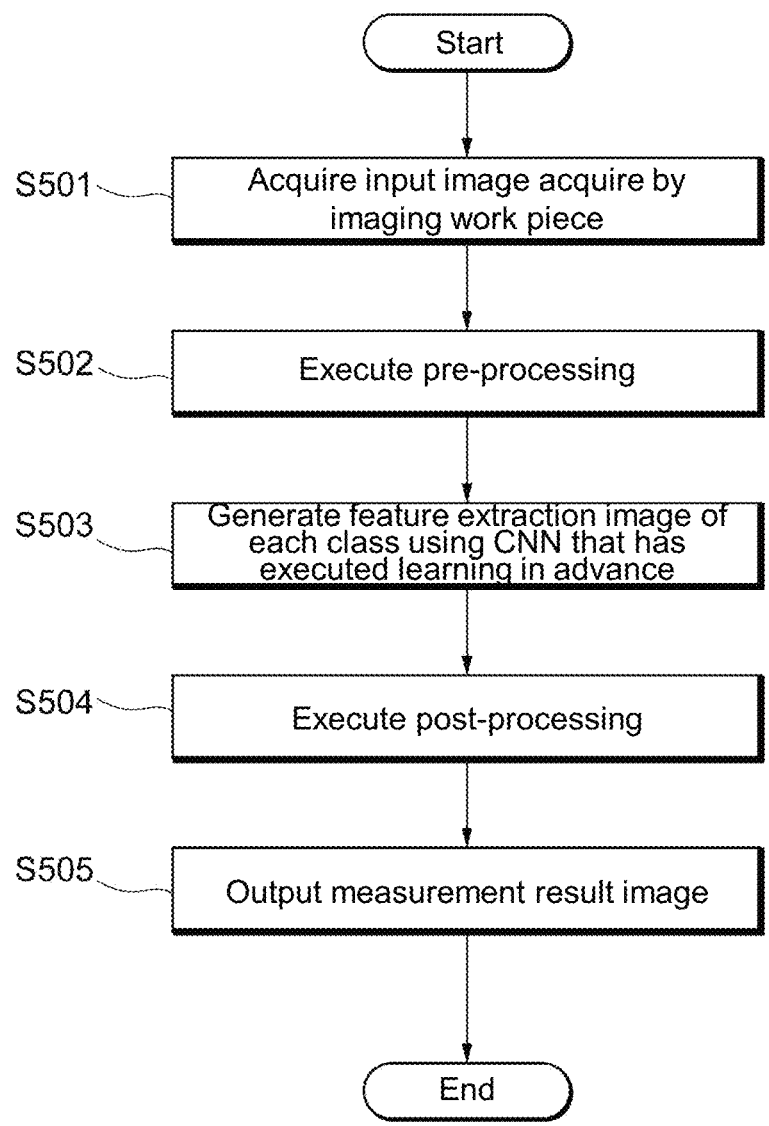
FIG. 12 is a flowchart illustrating the process sequence of an operation process in a defect inspection system according to this embodiment.

FIG. 11 is a flowchart illustrating the process sequence of the preparation process in the defect inspection system 1 according to this embodiment. FIG. 12 is a flowchart illustrating the process sequence of the operation process in the defect inspection system 1 according to this embodiment. Each step in the processing sequences illustrated in FIGS. 11 and 12, typically realized by the processor 110 of the defect inspection device 100 executing the image processing program 132 and the like.

Referring to FIG. 11, in the preparation process, the defect inspection device 100 acquires an input image acquired by executing imaging using the camera 102 in a state in which a work piece that is a reference for an image measuring process is disposed at a predetermined position (Step S401). At this time, the input image (image data) generated by the camera 102 imaging the work piece is transmitted to the defect inspection device 100 and is expanded in the main memory 112 of the defect inspection device 100.

Subsequently, the defect inspection device 100 accepts selection of a setting mode (S402). In a case in which the setting mode is a manual mode (Case: Manual mode), the defect inspection device displays the manual setting screen 700 and accepts a setting of a judgment parameter from the user (S411).

On the other hand, in a case in which the setting mode is the semi-automatic mode (Case: Semi-automatic mode), the defect inspection device 100 first provisionally sets the judgment parameter (S421). Next, a setting image is generated using the judgment parameter that has been provisionally set, and specifying of a third feature area is accepted from the user for the second feature area displayed on the setting image (S422). The defect inspection device 100 updates the judgment parameter on the basis of the specified third feature area (S423).

In a case in which the setting mode is the full-automatic mode (Case: Full-automatic mode), the defect inspection device 100 displays the automatic setting screen 900 and accepts specifying of a defective area from the user (S431). Then, the defect inspection device 100 sets the judgment parameter on the basis of the specified defective area (S432).

In addition, the defect inspection device 100 stores the set judgment parameter (S403). Then, the process in the preparation process ends.

Referring to FIG. 12, in the operation process, when a work piece that is a reference for the image measuring process arrives at the imaging viewing field 6 of the camera 102, the defect inspection device 100 acquires an input image acquired by imaging the work piece using the camera 102 (S501). At this time, the input image (image data) generated by the camera 102 imaging the work piece is transmitted to the defect inspection device 100 and is expended in the main memory 112 of the defect inspection device 100.

Subsequently, the defect inspection device 100 executes pre-processing for the acquired input image (S502). In addition, the defect inspection device 100 executes a process of extracting features for each type (class) of one or a plurality of features from the input image after the pre-processing using the CNN that has executed learning in advance. The defect inspection device 100 generates a feature extraction image for one or each of a plurality of classes through this process of extracting features (S503).

Subsequently, the defect inspection device 100 executes post-processing, thereby generating a measurement result image (S504).

Finally, the defect inspection device 100 outputs the generated measurement result image (S505). An output destination of the measurement result image may be the display 104 or the like or may be the PLC 10 and/or the database device 12 connected through the higher-rank network 8. Then, the process of the operation process ends. In addition, instead of the measurement result image or together with the measurement result image, the defect inspection device 100 may output an inspection result including at least information indicating whether or not a defect is included in the inspection target. The inspection result is, for example, transmitted to a predetermined operation machine that executes classification of an inspection target in the production line. Accordingly, the operation machine can execute automatic classification of an inspection target according to the inspection result.

In addition, a condition for starting the processing sequence of the operation process illustrated in FIG. 12 may be any one of a trigger signal transmitted from a timing sensor detecting arrival of a work piece, an execution start instruction from a higher-rank device, and an instruction from the user.

When presence/absence of a defect is inspected using a result output by the identification part that has executed learning in advance, the defect inspection device 100 according to this embodiment can appropriately set judgment parameters used for judging presence/absence of a defect in a simplified manner. In such a defect inspection device, the judgment parameters can be appropriately set, and accordingly, erroneous judgment decreases. Particularly, since noise can be decreased, erroneous detection of recognizing a defect that is not a real defect decreases. In addition, since the judgment parameters can be set in a simplified manner, the number of setting processes and the number of establishment processes of the defect inspection device can be decreased.

In addition, according to the defect inspection device 100 of this embodiment, setting of the judgment parameters used for separating a noise included in the feature extraction image output by the CNN engine having a plurality of classes that have been learned in advance and a defect to be extracted from each other can be facilitated. More specifically, the defect inspection device 100 according to this embodiment has a function of allowing a user to adjust at least a preset threshold (semi-automatic mode). Accordingly, the user may adjust a threshold only in a case in which the preset threshold is not appropriate, and thus the load of setting the judgment parameters can be decreased.

In addition, the defect inspection device 100 according to this embodiment has the manual mode and the full-automatic mode in addition to the semi-automatic mode described above as modes for setting the judgment parameters. For example, by using the full-automatic mode for setting the judgment parameters, an operator can appropriately set the judgment parameters by only designating a defective area. In this way, since the defect inspection device according to this embodiment has a plurality of setting modes, an appropriate setting mode can be selected in accordance with the degree of skill of an operator.

As above, while the embodiment of the disclosure has been described in detail, the description until now is merely an example of the disclosure in every aspect. In addition, a part or the whole of the embodiment described above may be described as in the following supplementary notes but is not limited thereto.

(Supplementary Note 1)

A defect inspection device (100) including:

an acquisition part (114) that acquires an inspection image of an inspection target object;

an image generating part (156) that generates one or more feature extraction images by applying an identification part, which has completed learning, that has executed learning in advance to extract one or more features using learning image data to the inspection image;

an inspection part (170) that specifies an area corresponding to a defect on the basis of one or more judgment parameters for judging presence/absence of a detection target portion in the inspection target object and a binary image generated on the basis of the feature extraction images; and a setting part (166) that calculates an image score based on a density of a color of pixels of a setting image using the setting image that is the binary image in which an area corresponding to the defect is specified and updates the judgment parameters such that a difference between an image score of the inside of the area and an image score of the outside of the area becomes relatively large.

(Supplementary Note 2)

The defect inspection device (100) described in Supplementary note 1, in which binary image is composed of white pixels and black pixels, a density value is associated with each of the white pixels and the black pixels, and the setting part (166) calculates a sum value of density values of a plurality of pixels included inside the area as a first image score, calculates a sum value of density values of a plurality of pixels included outside the area as a second image score, and updates the judgment parameters such that a difference between the first image score and the second image score becomes a maximum.

(Supplementary Note 3)

The defect inspection device (100) described in Supplementary note 1 or 2, in which the inspection part (170) determines presence/absence of a defect on the basis of the updated judgment parameters and the binary image and outputs a judgment result.

(Supplementary Note 4)

The defect inspection device (100) described in Supplementary note 3, in which the inspection part (170) outputs the binary image of which a defect has been specified on the basis of at least the updated judgment parameters as the judgment result.

(Supplementary Note 5)

The defect inspection device (100) described in any one of Supplementary notes 1 to 4, in which the judgment parameters include a binarization level used for generating the binary image.

(Supplementary Note 6)

The defect inspection device (100) described in any one of Supplementary notes 1 to 5, in which the judgment parameters include one or more judgment items used for determining the defect and a judgment threshold set for each of the judgment items.

(Supplementary Note 7)

The defect inspection device (100) described in Supplementary note 6, in which the one or more judgment items used for judging the defect include at least one of an area, a width and/or a height of a bounding rectangle, a circumference, an aspect ratio, and circularity of a predetermined area represented as a group of pixels having the same color in the binary image, and the judgment threshold includes an upper limit value and/or a lower limit value set for each of the judgment items.

(Supplementary Note 8)

The defect inspection device (100) described in Supplementary note 6 or 7, in which the judgment items and the judgment threshold are determined on the basis of a feature of a defect included in learning image data used when the image generating part or the inspection part executes learning.

(Supplementary Note 9)

The defect inspection device (100) described in any one of Supplementary notes 1 to 8, further including a display part (104) that accepts designation of the area, in which the inspection part (170) specifies an area judged as a defect on the basis of the judgment parameters set in advance and outputs the specified area to the display part (104) together with the inspection image, and the setting part (166) generates the setting image on the basis of designation of the area accepted through the display part.

(Supplementary Note 10)

The defect inspection device (100) described in any one of Supplementary notes 1 to 9, in which the inspection part (170) specifies an area judged as a defect in the binary image on the basis of a judgment threshold set for each of one or more feature quantities used for judging a defect in the binary image and presents the specified area to a user, and the setting part (166) accepts designation of an area that is judged as a defect by the inspection part (170) but should not have been judged as a defect and/or an area that is not judged as a defect by the inspection part but should have been judged as a defect from the user and updates the judgment threshold on the basis of the designation.

(Supplementary Note 11)

The defect inspection device (100) described in any one of Supplementary note 10, in which the judgment parameters include one or more judgment items used for judging the defect and a judgment threshold set for each of the judgment items, and the one or more judgment items used for judging the defect and the judgment threshold are determined on the basis of designation from the user.

(Supplementary Note 12)

A defect inspection method using a computer (100), the defect inspection method including:

a step of acquiring an inspection image of an inspection target object;

a step of generating one or more feature extraction images by applying an identification part, which has completed learning, that has executed learning in advance to extract one or more features using learning image data to the inspection image;

a step of specifying an area corresponding to a defect on the basis of one or more judgment parameters for judging presence/absence of a detection target portion in the inspection target object and a binary image generated on the basis of the feature extraction images; and a step of calculating an image score based on a density of a color of pixels of a setting image using the setting image that is the binary image in which an area corresponding to the defect is specified and updating the judgment parameters such that a difference between an image score of the inside of the area and an image score of the outside of the area becomes relatively large.
(Supplementary Note 13)
A program causing a computer (100) to function as:
    a part that acquires an inspection image of an inspection target object;
    a part that generates one or more feature extraction images by applying an identification part, which has completed learning, that has executed learning in advance to extract one or more features using learning image data to the inspection image;
    a part that specifies an area corresponding to a detection target portion on the basis of one or more judgment parameters for judging presence/absence of a defect in the inspection target object and a binary image generated on the basis of the feature extraction images; and
    a part that calculates an image score based on a density of a color of pixels of a setting image using the setting image that is the binary image in which an area corresponding to the defect is specified and updates the judgment parameters such that a difference between an image score of the inside of the area and an image score of the outside of the area becomes relatively large.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A defect inspection device comprising:
a processor configured to:
acquire an inspection image of an inspection target object;
generate one or more feature extraction images by applying a CNN engine, which has completed learning, that has executed learning in advance to extract one or more features using learning image data to the inspection image;
specify an area corresponding to a defect on a basis of one or more judgment parameters for judging presence/absence of a defect in the inspection target object and a binary image generated on a basis of the feature extraction images, wherein the binary image is composed of white pixels and black pixels, and a density value is associated with each of the white pixels and the black pixels; and
calculate a first image score and a second image score based on density values of a color of pixels of a setting image, wherein the setting image is the binary image that includes the area corresponding to the defect and updates the judgment parameters such that a difference between the first image score and the second image score becomes a maximum,
wherein the first image score is a sum value of density values of a plurality of pixels comprised inside the area, and the second image score is a sum value of density values of a plurality of pixels comprised outside the area,
wherein the processor specifies an area judged as a defect in the binary image on a basis of a judgment threshold set for each of one or more feature quantities used for judging a defect in the binary image and presents the specified area to a user,
the processor accepts designation of an area that is not judged as a defect but should have been judged as a defect from the user and updates the judgment threshold on a basis of the designation,
wherein the judgment threshold is updated after the designation of the area that is not judged as the defect has been accepted.

2. The defect inspection device according to claim 1, wherein the processor determines presence/absence of a defect on a basis of the updated judgment parameters and the binary image and outputs a judgment result.

3. The defect inspection device according to claim 2, wherein the processor outputs the binary image of which a defect has been specified on a basis of at least the updated judgment parameters as the judgment result.

4. The defect inspection device according to claim 1, wherein the judgment parameters comprise a binarization level used for generating the binary image.

5. The defect inspection device according to claim 2, wherein the judgment parameters comprise a binarization level used for generating the binary image.

6. The defect inspection device according to claim 3, wherein the judgment parameters comprise a binarization level used for generating the binary image.

7. The defect inspection device according to claim 1, wherein the judgment parameters comprise one or more judgment items used for determining the defect and the judgment threshold set for each of the judgment items.

8. The defect inspection device according to claim 7, wherein the one or more judgment items used for judging the defect comprise at least one of an area, a width and/or a height of a bounding rectangle, a circumference, an aspect ratio, and circularity of a predetermined area represented as a group of pixels having a same color in the binary image, and the judgment threshold comprises an upper limit value and/or a lower limit value set for each of the judgment items.

9. The defect inspection device according to claim 7, wherein the one or more judgment items and the judgment threshold are determined on a basis of a feature of a defect comprised in the learning image data used when the processor executes learning.

10. The defect inspection device according to claim 1, wherein the processor is configured to control a display to accept designation of the area,
wherein the processor specifies an area judged as a defect on a basis of the judgment parameters set in advance and outputs the specified area to the display together with the inspection image, and
wherein the processor generates the setting image on a basis of designation of the area accepted through the display.

11. The defect inspection device according to claim 1, wherein the processor accepts designation of an area that is judged as a defect but should not have been judged as a defect from the user and updates the judgment threshold on a basis of the designation.

12. The defect inspection device according to claim 11, wherein the judgment parameters comprise one or more judgment items used for judging the defect and the judgment threshold set for each of the judgment items, and
wherein the one or more judgment items used for judging the defect and the judgment threshold are determined on a basis of designation from the user.

13. A defect inspection method using a computer, the defect inspection method comprising:
acquiring an inspection image of an inspection target object by a processor;

generating one or more feature extraction images by applying a CNN engine by the processor, the CNN engine has completed learning, and has executed learning in advance to extract one or more features using learning image data to the inspection image;

specifying an area corresponding to a defect on a basis of one or more judgment parameters for judging presence/absence of a defect in the inspection target object and a binary image generated on a basis of the feature extraction images by the processor, wherein the binary image is composed of white pixels and black pixels, and a density value is associated with each of the white pixels and the black pixels;

specifying an area judged as a defect in the binary image on a basis of a judgment threshold set for each of one or more feature quantities used for judging a defect in the binary image and presents the specified area to a user by the processor;

accepting designation of an area that is not judged as a defect but should have been judged as a defect from the user and updates the judgment threshold on a basis of the designation by the processor; and calculating a first image score and a second image score based on density values of a color of pixels of a setting image by the processor, wherein the setting image is the binary image that includes the area corresponding to the defect and updating the judgment parameters such that a difference between the first image score and the second image score becomes a maximum, wherein the first image score is a sum value of density values of a plurality of pixels comprised inside the area, and the second image score is a sum value of density values of a plurality of pixels comprised outside the area, wherein the judgment threshold is updated after the designation of the area that is not judged as the defect has been accepted.

14. A non-transitory computer readable recording medium comprising a program causing a processor of a computer configured to:

acquire an inspection image of an inspection target object;

generate one or more feature extraction images by applying a CNN engine, which has completed learning, that has executed learning in advance to extract one or more features using learning image data to the inspection image;

specify an area corresponding to a defect on a basis of one or more judgment parameters for judging presence/absence of a defect in the inspection target object and a binary image generated on a basis of the feature extraction images, wherein the binary image is composed of white pixels and black pixels, and a density value is associated with each of the white pixels and the black pixels;

specify an area judged as a defect in the binary image on a basis of a judgment threshold set for each of one or more feature quantities used for judging a defect in the binary image and presents the specified area to a user, accept designation of an area that is not judged as a defect but should have been judged as a defect from the user and updates the judgment threshold on a basis of the designation; and calculate a first image score and a second image score based on density values of a color of pixels of a setting image, wherein the setting image is the binary image that includes the area corresponding to the defect and updates the judgment parameters such that a difference between the first image score and the second image score becomes a maximum, wherein the first image score is a sum value of density values of a plurality of pixels comprised inside the area, and the second image score is a sum value of density values of a plurality of pixels comprised outside the area, wherein the judgment threshold is updated after the designation of the area that is not judged as the defect has been accepted.

* * * * *